(12) United States Patent
Huang et al.

(10) Patent No.: US 11,280,698 B2
(45) Date of Patent: Mar. 22, 2022

(54) SYSTEMS AND METHODS FOR MAKING A NON-CONTACT MEASUREMENT OF INSERTION LOSS FOR AN OPTICAL FIBER CONNECTOR

(71) Applicant: CORNING RESEARCH & DEVELOPMENT CORPORATION, Corning, NY (US)

(72) Inventors: Jinxin Huang, Corning, NY (US); Dmitri Vladislavovich Kuksenkov, Elmira, NY (US); William James Miller, Horseheads, NY (US); Nikolay Timofeyevich Timofeev, St. Petersburg (RU); William Allen Wood, Painted Post, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/933,099

(22) Filed: Jul. 20, 2020

(65) Prior Publication Data

US 2021/0025780 A1 Jan. 28, 2021

Related U.S. Application Data

(60) Provisional application No. 62/878,799, filed on Jul. 26, 2019.

(51) Int. Cl.
*G01M 11/00* (2006.01)
*G01M 11/02* (2006.01)
(Continued)

(52) U.S. Cl.
CPC ........ *G01M 11/33* (2013.01); *G01M 11/0214* (2013.01); *G02B 6/385* (2013.01); *G02B 6/40* (2013.01)

(58) Field of Classification Search
CPC .......... A61K 2039/541; A61K 2039/57; A61K 2039/6093; A61K 39/35; A61K 9/1647;
(Continued)

(56) References Cited

U.S. PATENT DOCUMENTS

| 4,441,026 A | 4/1984 | Moriwaki et al. |
| 7,079,743 B2 | 7/2006 | Lauzier et al. |

(Continued)

FOREIGN PATENT DOCUMENTS

| JP | 3942458 B2 | 7/2007 |
| KR | 10-2056668 B1 | 12/2019 |

OTHER PUBLICATIONS

C.M. Miller, "Single-mode fiber splicing, OFC 1984, 44-45".
(Continued)

*Primary Examiner* — Sunghee Y Gray
(74) *Attorney, Agent, or Firm* — Adam R. Weeks

(57) ABSTRACT

Non-contact methods of predicting an insertion loss of a test optical fiber connector are disclosed. Light is sent down the at least one optical fiber of the connector in the fundamental mode to emit an output light beam. The output-beam image is captured at different distances from the fiber end faces to define multiple output-beam images each associated with one of the multiple measurement positions. A Gaussian curve is then fitted to the multiple output-beam images to determine a mode field diameter, an offset, and a tilt of the output light beam. A Gaussian field model that incorporates the offset, the tilt, and the mode-field diameter is then used to predict the insertion loss when connecting to a reference optical fiber of a reference optical fiber connector.

12 Claims, 14 Drawing Sheets

(51) Int. Cl.
  *G02B 6/38* (2006.01)
  *G02B 6/40* (2006.01)

(58) Field of Classification Search
  CPC .............. A61K 2300/00; A61K 36/074; A61K 36/185; A61K 36/232; A61K 36/258; A61K 36/54; A61K 36/718; A61K 36/736; A61K 36/756; A61K 36/758; A61K 36/9068; A61K 45/06; A61P 37/00; A61P 37/02; A61P 37/08; G01M 11/0214; G01M 11/33; G02B 6/385; G02B 6/40
  USPC ........................................................ 356/73.1
  See application file for complete search history.

(56) References Cited

U.S. PATENT DOCUMENTS

| | | | |
|---|---|---|---|
| 8,699,012 B2 | 4/2014 | Duis et al. | |
| 8,908,167 B2 | 12/2014 | Flora et al. | |
| 2004/0184815 A1* | 9/2004 | Korolev | H04B 10/2525 398/148 |
| 2007/0140634 A1* | 6/2007 | Windeler | G02B 6/03611 385/123 |
| 2015/0177097 A1 | 6/2015 | Clarke et al. | |
| 2016/0033325 A1 | 2/2016 | Fusco et al. | |

OTHER PUBLICATIONS

Anonymous: "Measurement of Laser Beam Profile and Propagation Characteristics", Jun. 3, 2019, pp. 1-10, XP055756389, Retrieved from the Internet: Retrieved from the Internet URL:https://web.archive.org/web/20190603003153/http://www.sintecoptronics.com/BeamAnalyser.asp.

Chanclou et al., "Expanded single-mode fiber using graded index multimode fiber", Optical Engineering, vol. 43, No. 7, pp. 1634-1642.

D. Marcuse, "Loss Analysis of Single Mode Fiber Splices," Bell Sys. Tech. J. 56, 1977, pp. 703-718.

European Patent Application No. 20187672.9 Extended European Search Report and Search Opinion dated Dec. 16, 2020; 12 Pages; European Patent Office.

Nemoto et al., "Analysis of splice loss in single-mode fibres using a Gaussian field approximation", Optical and Quantum Electronics 11, 1979, pp. 447-457.

Norland et al., "Quality Assurance of Multifiber Connectors", Retrieved on Dec. 18, 2020, 9 pages.

* cited by examiner

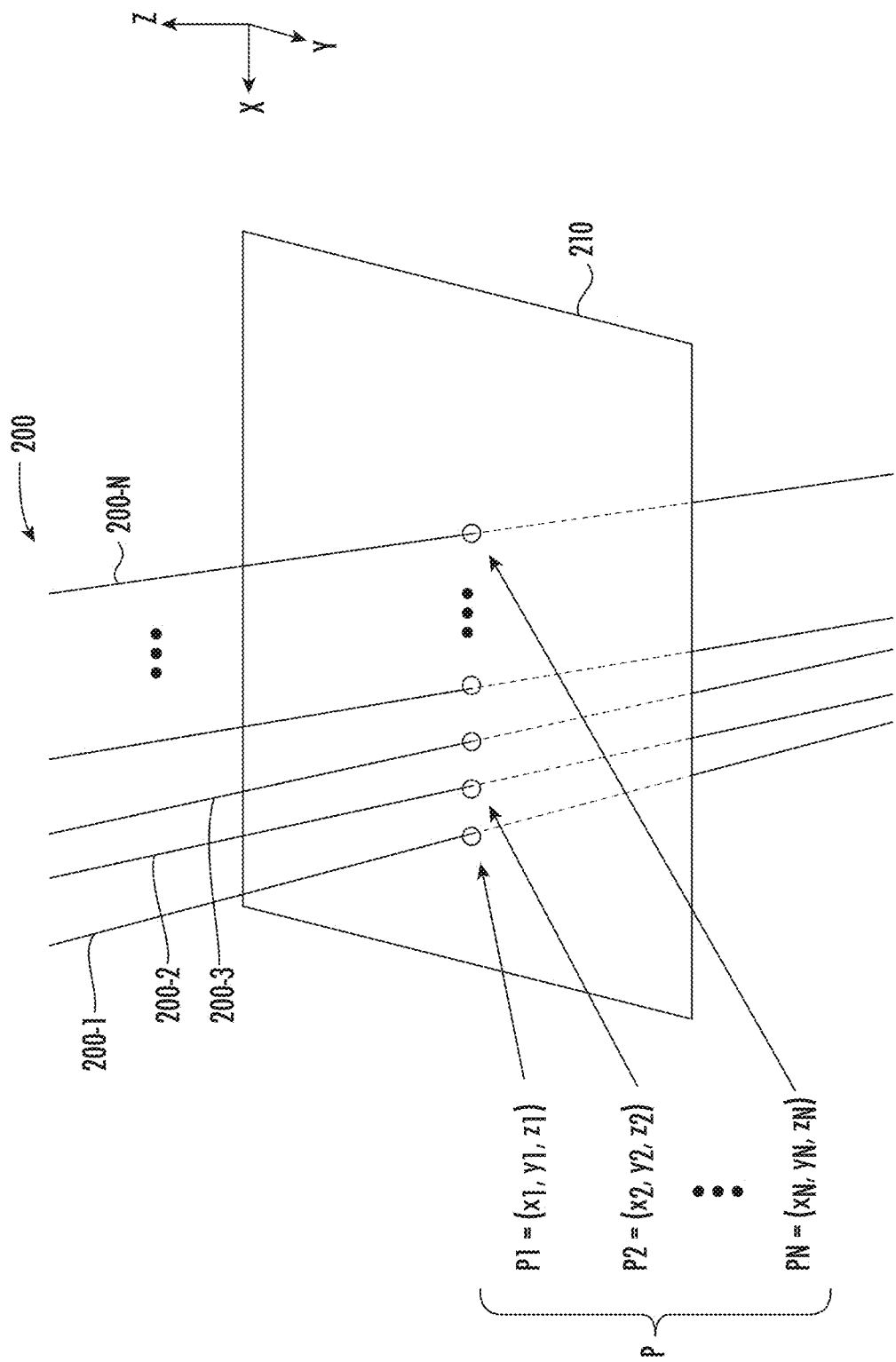

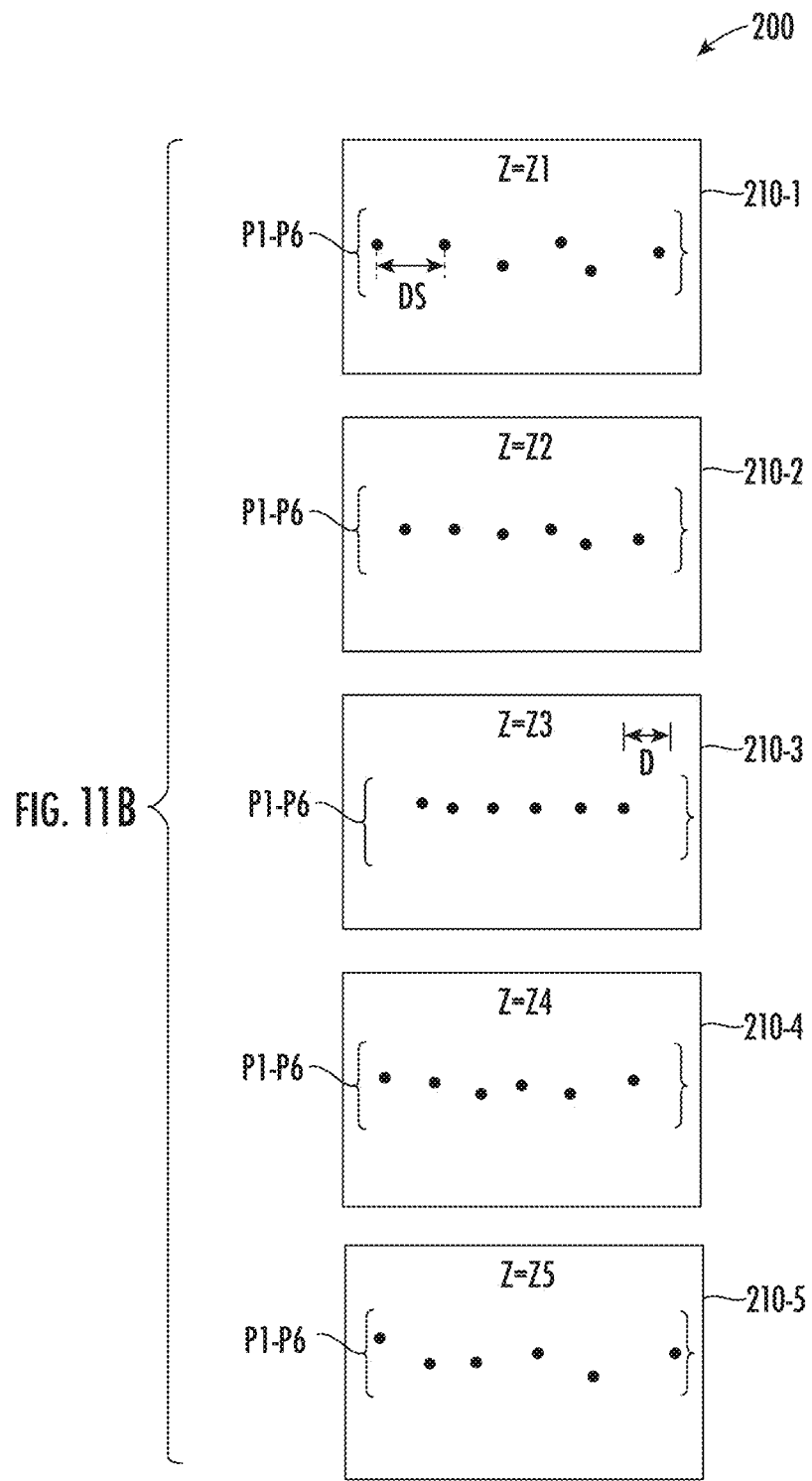

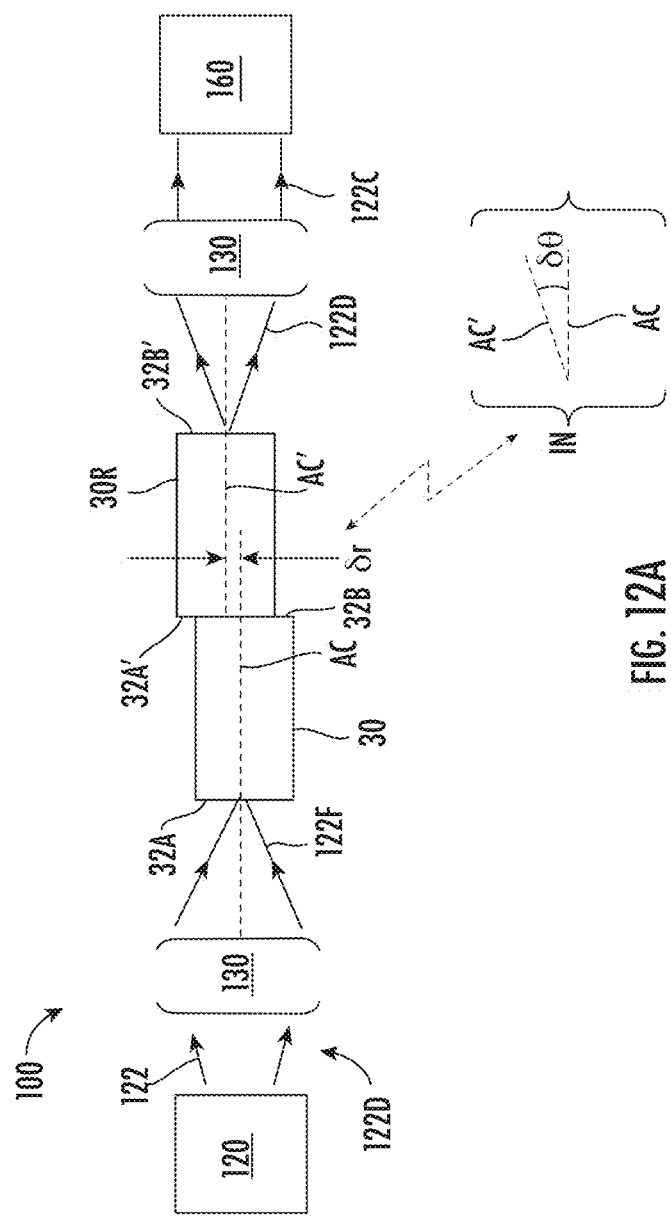

SYSTEMS AND METHODS FOR MAKING A NON-CONTACT MEASUREMENT OF INSERTION LOSS FOR AN OPTICAL FIBER CONNECTOR

PRIORITY APPLICATION

This application claims the benefit of priority of U.S. Provisional Application No. 62/878,799, filed on Jul. 26, 2019, the content of which is relied upon and incorporated herein by reference in its entirety.

FIELD

The present disclosure relates to optical fiber connectors and in particular relates to systems and methods for making a non-contact measurement of the insertion loss for an optical fiber connector.

BACKGROUND

Optical fiber connectors are used to optically couple one or more optical fibers to either other optical fibers or to an optical device. Multifiber connectors are used to terminate optical fiber cables that carry multiple optical fibers. One type of multifiber cable is called a "patch cord" or a "jumper," which has a relatively short length (e.g., a few meters) and is typically used to connect telecommunication devices (e.g., network hardware) separated by short distance (e.g., within the same data center or within the same server room).

Multifiber jumpers need to be tested for insertion loss as part of quality control. A typical contact-based procedure involves bringing the jumper being measured (called the "device under test" or "DUT") into physical contact with another jumper of very high quality, called a "reference jumper" The measured insertion loss depends strongly on the relative location of the DUT fibers relative to the reference jumper fibers, as well as on the optical attributes of the fibers, such as the optical mode field diameters. An advantage of the contact-based measurement is that is replicates the actual use of the DUT in the field since the DUT will be placed in contact with another multifiber connector.

On the other hand, there are some drawbacks to the contact-based measurement approach. The reference jumpers require frequent replacement due to wear and/or damage. Also, because the reference jumpers need to be of high quality, they are relatively expensive. There is also the risk of damage to the DUT when contacting the reference jumper.

To avoid the drawbacks of contact-based measurements, non-contact measurement methods have been developed. However, the non-contact methods developed to date have their own limitations. One limitation is the inability to distinguish fiber offset from fiber tilt. As it turns out, a beam tilt is considerably more benign than a beam offset for the sub-degree tilts typically encountered in practice. Hence, characterizing all fiber dislocations as an "offset" can result in a drastic overestimation of the connector insertion loss.

SUMMARY

An aspect of the disclosure is a non-contact method of predicting an insertion loss of a test optical fiber connector that includes at least one optical fiber having an output end face, comprising: a) sending light down the at least one optical fiber in substantially only a fundamental mode and emitting the light from the output end face as an output light beam; b) for each of two or more measurement positions at different axial distances from the output end face, capturing at least one output-beam image using a sensor array to define two or more output-beam images associated with the two or more measurement positions; c) fitting a Gaussian curve to the two or more output-beam images to determine a mode field diameter (MFD), an offset, and a tilt of the output light beam at the output end face of the at least one optical fiber, wherein the offset is relative to an ideal location on the output end face and the tilt is relative to an ideal central axis of the at least one optical fiber; and d) using the offset, the tilt, and the MFD in a Gaussian field model to predict the insertion loss that would result when connecting to a reference optical fiber of a reference optical fiber connector.

Another aspect of the disclosure is a non-contact method of predicting an insertion loss of a test optical fiber connector that includes at least one optical fiber having an output end face, comprising: a) sending light down the at least one optical fiber in substantially only a fundamental mode and emitting the light from the output end face as an output light beam; b) for each of two or more measurement positions at different axial distances from the output end face, capturing at least one output-beam image using a sensor array to define two or more output-beam images associated with the two or more measurement positions; c) using the two or more output-beam images to define an intensity distribution of the output light beam as a function of the axial distance using Gaussian beam propagation; d) determining from the intensity distribution of the output light beam a MFD, an offset, and a tilt of the output light beam at the output end face of the at least one optical fiber, wherein the offset is relative to an ideal location on the output end face and the tilt is relative to an ideal central axis of the at least one optical fiber; and e) using the offset, the tilt, and the MFD in a Gaussian field model to predict the insertion loss that would result when connecting to a reference optical fiber of a reference optical fiber connector.

Another aspect of the disclosure is a non-contact method of predicting an insertion loss of a test optical fiber connector when connecting to at least one reference optical fiber of a reference optical fiber connector, the test optical fiber connector supporting at least one optical fiber, the method comprising: a) sending light down the at least one optical fiber in a fundamental mode of the light and emitting an output light beam; b) for each of multiple measurement positions at different axial distances from the at least one optical fiber, capturing at least one output-beam image to define multiple output-beam images each associated with one of the multiple measurement positions; c) fitting a Gaussian curve to the multiple output-beam images to determine a MFD, an offset, and a tilt of the output light beam; and d) employing a Gaussian field model that incorporates the offset, the tilt, and the MFD to predict the insertion loss.

Another aspect of the disclosure is a system for performing a method predicting an insertion loss when connecting a test jumper that supports least one test optical fiber to a reference jumper that supports at least one reference optical fiber, the system comprising: a light source that emits light; a beam-conditioning optical system operably disposed to receive the light from the light source to form conditioned light; a first connector support device that supports a first connector of the test jumper, wherein the first connector supports a first end of the at least one test optical fiber and wherein the first end receives the conditioned light, which travels in the at least one test optical fiber as a single-mode guided wave; a second connector support device that supports a second connector of the test jumper, wherein the second connector supports a second end of the at least one test optical fiber, wherein the second end outputs the single-mode guided wave as an output beam; a sensor device operably supported by a movable stage and configured to receive and detect the output beam at each of different axial distances from the second end of the at least one test optical fiber and in response generate sensor signals corresponding to output-beam images of the detected output beams; and a processor operably connected to the sensor device and configured to receive and process the sensor signals for each of the different axial distances: i) fitting a Gaussian curve to the output-beam images at the different axial distances to determine a MFD, an offset, and a tilt of the output light beam; and ii) employing a Gaussian field model that incorporates the offset, the tilt, and the MFD to predict the insertion loss.

Another aspect of the disclosure is a method of estimating relative positions of end faces of multiple optical fibers supported by a test optical fiber connector to have a nominal spacing, the method comprising: a) generating output light beams from the end faces of the multiple optical fibers; b) capturing output-beam images from the output light beams at different distances from the end faces; c) determining a centroid for each output-beam image; d) using the centroids to define a beam axis for each output light beam, thereby defining a set of light beam axes; e) defining a plane where the set of beam axes intersect the plane at respective intersection positions having intersection position spacings between adjacent intersection positions; and f) finding an optimum axial position of the plane where the intersection position spacings are closest to the nominal spacing and where the intersection positions represent the relative positions of the end faces of the multiple optical fibers.

Another aspect of the disclosure is a method of estimating relative positions of end faces of multimode optical fibers supported by a test optical fiber connector to have a nominal spacing, the method comprising: a) generating respective output light beams from end faces of the multimode optical fibers; b) capturing for each of the output light beams output-beam images at different distances from the end faces; c) determining a centroid for each output-beam image at each of the different distances; d) using the centroids for each output-beam image to define a beam axis for each output light beam, thereby defining a set of beam axes; e) defining a plane where the set of beam axes intersect the plane at respective intersection positions that define intersection position spacings between adjacent intersection positions; and 0 finding an optimum axial position of the plane where the intersection position spacings are closest to the nominal spacing and where the intersection positions represent the relative positions of the optical fiber end faces of the multimode optical fibers, and wherein the optimum axis position of the plane comprises an estimate of an axial position of the optical fiber end faces.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which:

FIG. 11A is a schematic diagram of N example beam axes and corresponding intersection positions $PN=(x_N, y_N, z_N)$ at a plane in connection with the plane fitting method disclosed herein for determining fiber end face locations.

FIG. 11B is schematic representation of example planes at different z positions showing how the spacings between the intersection positions changes with plane location, and showing an optimum plane at the axial position z3 where the spacings between the intersection positions P1-P6 is minimum.

FIG. 12A is a schematic diagram of a representative fiber optical system configuration for insertion loss modeling based on ray tracing.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this detailed description.

Cartesian coordinates are shown in some of the Figures for the sake of reference and are not intended to be limiting as to direction or orientation. The Cartesian coordinates and the fitting parameters introduced and discussed below appear as italics in the equations set forth below.

A cut-off wavelength that defines single mode and multimode operation of an optical fiber is denoted $\lambda_{CO}$, with a wavelength $\lambda > \lambda_{CO}$ defining single mode operation and a wavelength $\lambda < \lambda_{CO}$ defining multimode operation.

The symbol "μm" used herein stands for "micron," which is $1 \times 10^{-6}$ meter.

Jumpers

Figure 1A:
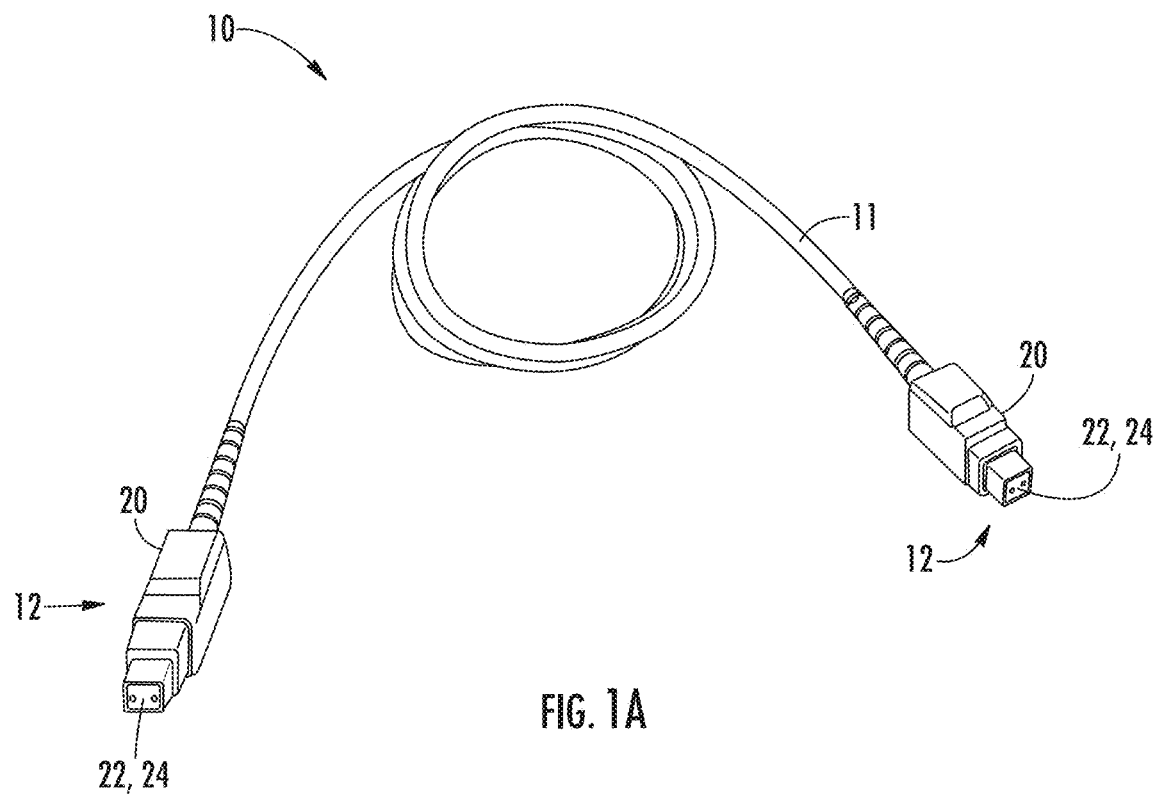
FIG. 1A is an elevated view of an example cable assembly that can be tested using the non-contact insertion loss measurement system disclosed herein.

FIG. 1A is an elevated view of an example cable assembly 10 that can be tested using the non-contact insertion loss measurement system disclosed herein. The cable assembly 10 includes a cable 11 having first and second opposite ends 12 respectively terminated by first and second optical fiber connectors 20. Thus, the cable assembly 10 can be used as a "jumper" and will be referred to as such in the description below, even though this disclosure may be applicable to other types of cable assemblies. For consistency, the cable 11 will be referred to as "jumper cable 11" and the optical fiber connectors 20 will be referred to as "jumper connectors 20." An example jumper connector 20 is shown in the close-up view of FIG. 1B. Although shown as a multifiber connector, the jumper connectors 20 may be single fiber connectors in some embodiments. Each jumper connector 20 has an end 22 (e.g. "output end 22") that includes an end surface 24. In an example, the end surface 24 is defined by a ferrule 26.

The cable 11 of the jumper 10 supports at least one optical fiber (i.e., a cable fiber, or as used hereinbelow, a "jumper fiber") 30 in a protective jacket (cable jacket) 31. Each jumper fiber 30 has a centerline AC. In an example, the cable 11 supports multiple (i.e., integer J) jumper fibers 30 arranged at the first and second jumper connectors 20 in p rows and q columns (p×q), such as 1×8 (J=8), 1×16 (J=16), 2×16 (J=32), 1×12 (J=12), 2×12 (J=24), 4×12 (J=48), etc. It is noted that in parts of the discussion below, the symbol "N" is also used for the integer number of jumper fibers 30.

Figure 1B:
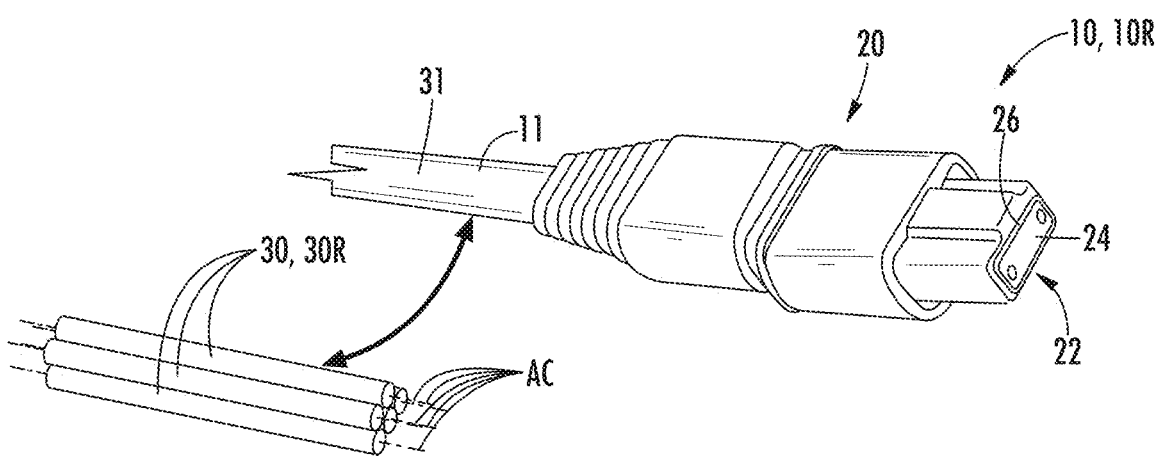
FIG. 1B is a close-up view of an example jumper connector showing example jumper fibers carried in a jumper cable.
Figure 1C:
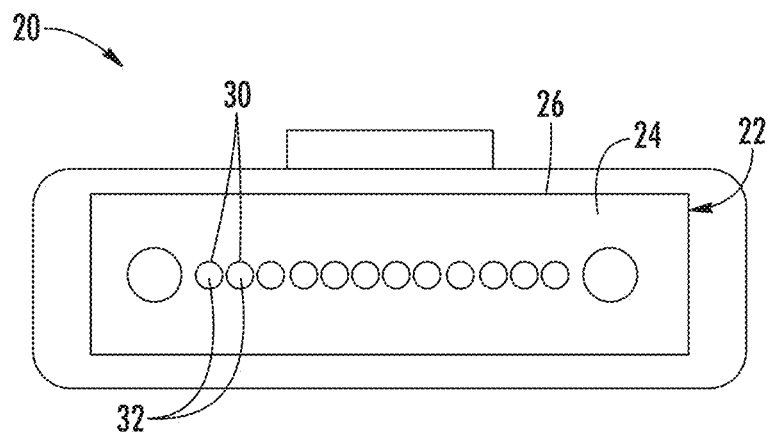
FIGS. 1C and 1D are end-on views example jumper connectors showing example arrangements of the jumper fibers at the end surface of the jumper connectors.
Figure 1D:
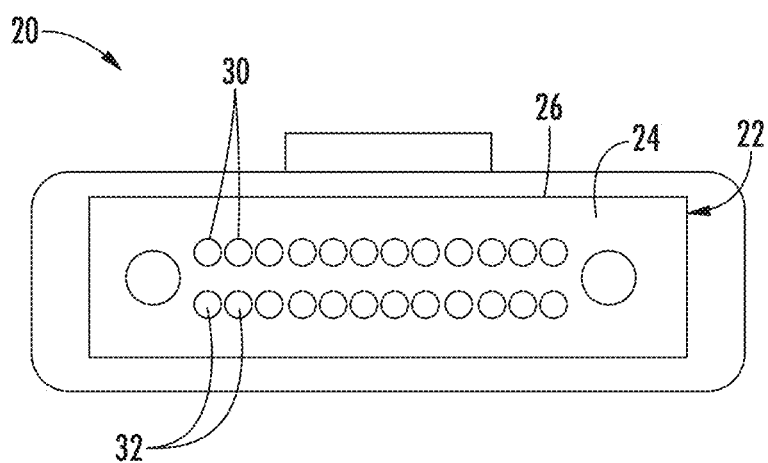

FIG. 1C is an end-on view of one of the jumper connectors 20 and shows an example of a 1×12 arrangement of the jumper fibers 30 at the end surface 24 of the jumper connector 20. FIG. 1D is similar to FIG. 1C, but shows an example of a 2×12 arrangement of the jumper fibers 30 at the end surface 24 of the jumper connector 20. Each jumper fiber 30 has first and second end faces 32 that terminate at or proximate to the respective end surfaces 24 of the first and second jumper connectors 20. In an example, the jumper cable 11 can include multiple jumper fibers 30 formed as a ribbon using matrix material, and the cable jacket 31 can have an elongate cross-sectional shape. Alternatively, the jumper cable 11 can include multiple jumper fibers 30 that are not bound together by matrix material so as to be "loose fibers."

The jumper connectors 20 as well as the other multifiber connectors mentioned herein can be of the type known and used in the field of optical connectivity, such as multifiber push-on/pull-off (MPO) connectors. The jumper fibers 30 can be single mode fibers, multimode fibers, "universal" mode fibers, or other types of optical fibers.

The jumper 10 that is being measured is referred to herein as the "jumper under test" or "test jumper." The discussion below also mentions a reference jumper, also referred to herein as a "golden jumper," which is denoted 10R and has reference jumper fibers 30R (see FIG. 1B). The reference jumper 10R is a jumper that has already been measured and carefully characterized so that it can be used to establish a baseline or reference measurement. In particular, a reference or golden jumper 10R has accurately known jumper fiber positions, mode field diameters (MFDs) at the first and second end faces 32, and insertion losses for all the jumper fibers 30 supported therein.

For convenience, the two jumper connectors 20 at the opposite ends of the jumper 10 can each be referred to as an input connector or an output connector, depending on how the jumper 10 is arranged in system 100, as described below. Likewise, the first and second end faces 32 of a jumper fiber 30 can each be referred to as an input end face or an output end face, depending on the direction of travel of light passing through the jumper fiber 30, and in some instances, are respectively denoted 32A and 32B (see. e.g., FIG. 2).

Measurement System

Figures 2, 2A:
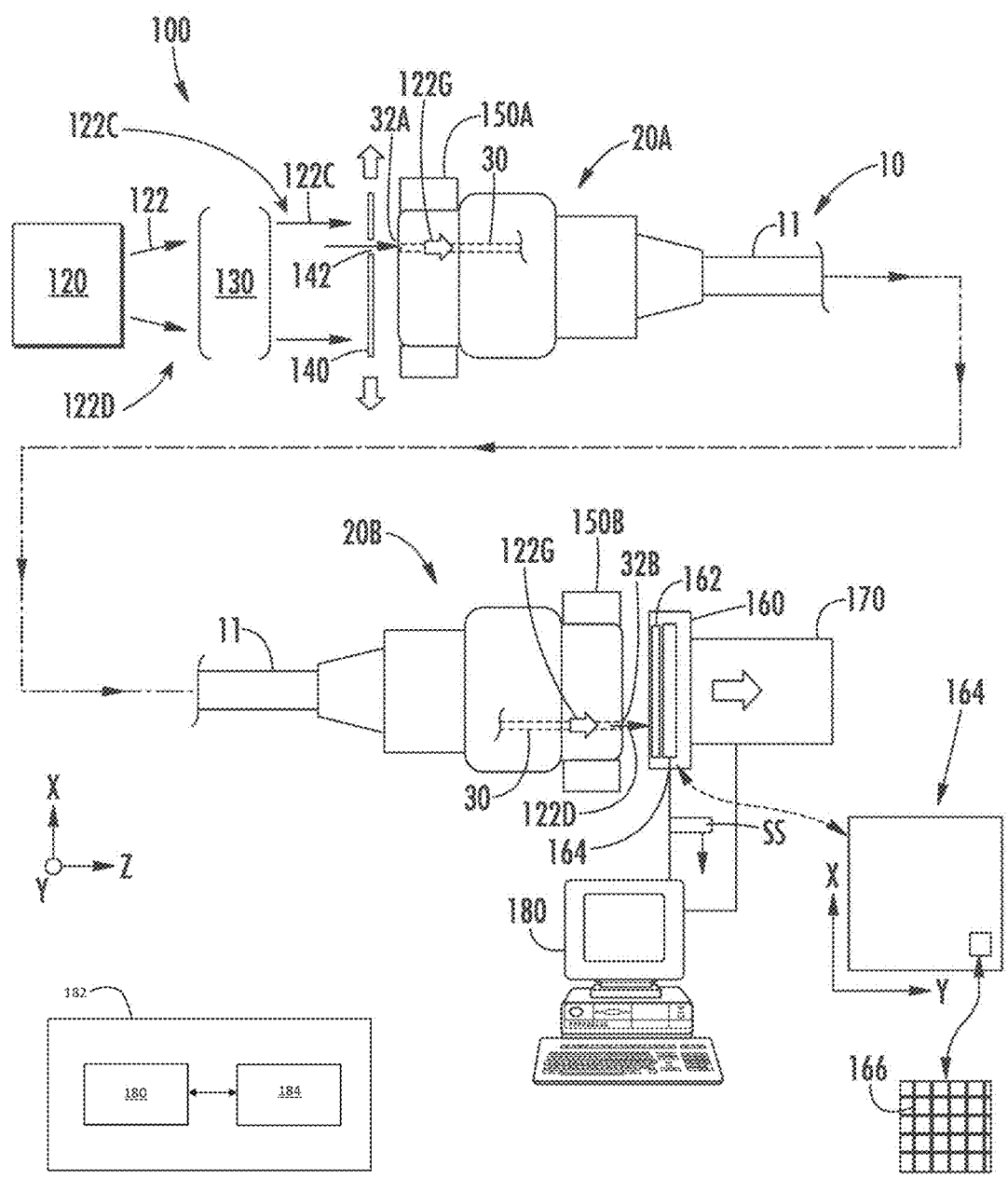
FIG. 2 is a schematic diagram of an example of a non-contact measurement system for measuring insertion loss.
FIG. 2A is a schematic representation of example processing circuitry for the non-contact measurement system of FIG. 2.

FIG. 2 is a schematic diagram of an example of the non-contact measurement system ("system") 100 for measuring the insertion loss of the jumper 10. The system 100 includes a light source 120 that emits light 122 of wavelength $\lambda_0$. In an example, the light source 120 comprises a light-emitting diode (LED) that operates at a wavelength $\lambda_0 = 940$ nm. A beam-conditioning optical system 130 is operably disposed to receive the light 122 and form conditioned light 122C. In an example, the emitted light 122 comprises divergent light 122D (also referred to as "diverging light beam 122D" or "output light beam 122D") and the beam-conditioning optical system 130 comprises a collimating optical system (not shown) so that the conditioned light 122C comprises substantially collimated light 122C.

The beam-conditioning optical system 130 can comprise one or more optical components as is known in the art. A movable (scanning) slit member 140 that includes at least one aperture or slit 142 can be operably disposed to selectively pass at least one portion of the conditioned light 122C. In an example, the slit member 140 is configured to be movable in the x-direction (referring to the coordinate system in FIG. 2) so that the aperture (slit) 142 can be selectively positioned along the x-direction (i.e., laterally positioned), as described in greater detail below. The slit member 140 can include multiple apertures (slits) 142 whose position correspond to the positions of select ones of the jumper fibers 30.

The measurement system 100 includes a first connector support device 150A that supports the input connector 20A of the jumper 10 so that the input connector 20A resides immediately adjacent the slit member 140. The measurement system 100 further includes a second connector support device 150B that supports the output connector 20B of the jumper 10 so that the output connector 20B resides immediately adjacent a sensor device 160. In an example, the sensor device 160 includes a cover glass 162 (also referred to as "cover sheet 162") and a sensor array 164 (e.g., a CCD array) that includes light-sensing pixels 166. In an example, the sensor device 160 comprises a CCD camera. The sensor array 164 defines a sensor array plane SP (see FIGS. 3A, 3B).

The sensor device 160 is operably supported on a movable stage 170 so that the sensor device 160 can be moved in the z-direction. In an example, the movable stage 170 can also be moved in the x-direction and the y-direction for aligning the output connector 20B with the sensor device 160. A processor 180 is operably connected to the sensor device 160 to receive and process from the sensor device sensor signals SS representative of the intensity distribution of the detected output beams, which are introduced and discussed below. The processor 180 can optionally be connected to the movable stage 170 to control the movement of the sensor device 160 as described below. In an example, the processor 180 can be part of a computer or controller. In an example, the processor 180 can comprise a controller configured to control the various operations of system 100 as described below.

To this end, FIG. 2A is a schematic representation of processing circuitry for a computer or controller, with the processing circuitry 182 including the processor 180 and a memory 184. The processor 180 may be embodied in a number of different forms. For example, the processor 180 may be embodied as a microprocessor or other processing element, a coprocessor, a controller, or various other computing or processing devices including integrated circuits such as, for example, an ASIC (application specific integrated circuit), an FPGA (field programmable gate array), a hardware accelerator, or the like. In an example embodiment, the processor 180 may be configured to execute instructions stored in a memory 184 or otherwise accessible to the processor 180. As such, whether configured by hardware or software methods, or by a combination thereof, the processor 180 may represent an entity (e.g., physically embodied in circuitry) capable of performing operations according to embodiments this disclosure. Thus, for example, when the processor 180 is embodied as an executor of software instructions, the instructions may specifically configure the processor 180 to perform operations according to this disclosure.

Still referring to FIG. 2A, the memory 184 may include one or more non-transitory storage or memory devices such as, for example, volatile, and/or non-volatile memory that may be either fixed or removable. The memory 184 may be configured to store information, data, applications, instructions, or the like for enabling the apparatus to carry out various functions in accordance with example embodiments of this disclosure. For example, the memory 184 could be configured to buffer input data for processing by the processor 180. Additionally or alternatively, the memory 184 could be configured to store instructions for execution by the processor 180. As yet another alternative, the memory 184 may include one of a plurality of databases that may store a variety of files, contents, or data sets. Among the contents of the memory 184, applications (e.g., client applications or service application) may be stored for execution by the processor 180 in order to carry out the functionality associated with each respective application.

Referring back to FIG. 2, in an example of the operation of system 100, the light source 120 emits light 122, which is received and conditioned by the beam-conditioning optical system 130 to form the aforementioned conditioned light 122C. The conditioned light 122C is then directed into the input end face 32A of one or more of the jumper fibers 30. In an example, the wavelength $\lambda_0$ of the conditioned light is greater than the cut-off wavelength (i.e., $\lambda_0 > \lambda_{CO}$), so that only a single mode travels in each of the jumper fibers 30. In this example, the beam-conditioning optical system 130 can be configured so that the conditioned light 122C has the same or a slightly larger numerical aperture (NA) than the jumper fiber 30. In another example, wherein the wavelength $\lambda_0 < \lambda_{CO}$, the conditioned light 122C can be substantially collimated to ensure that only the fundamental mode of the jumper fiber 30 is excited. In other examples discussed in greater detail below, the jumper fibers 30 constitute multimode fibers ($\lambda_0 < \lambda_{CO}$) and the conditioned light 122C defines an overfilled launch condition in which the conditioned light comprises converging or focused light (see, e.g., FIG. 12A).

As noted above, the movable slit member 140 can include a single slit 142 that can align with a select jumper fiber 30 or can have multiple slits 142 configured to align with select jumper fibers (e.g., every other fiber, every third fiber, non-adjacent fibers, etc.) for reasons discussed below. The conditioned light 122C coupled into each of the jumper fibers 30 travels therein as guided light or a "guided wave" 122G.

Figure 3A:
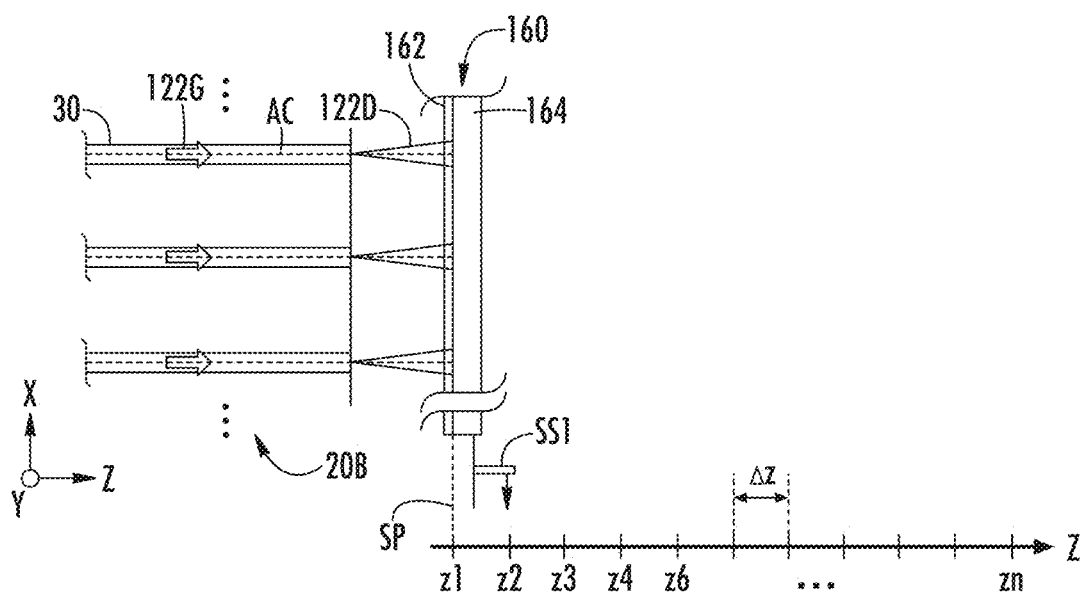
FIGS. 3A and 3B are close-up schematic diagrams of an output end of the non-contact measurement system of FIG. 2 and show how a sensor device can be moved to different measurement positions along a z-axis ("measurement distance") to record an image of output beams from respective jumper fibers.
Figure 3B:
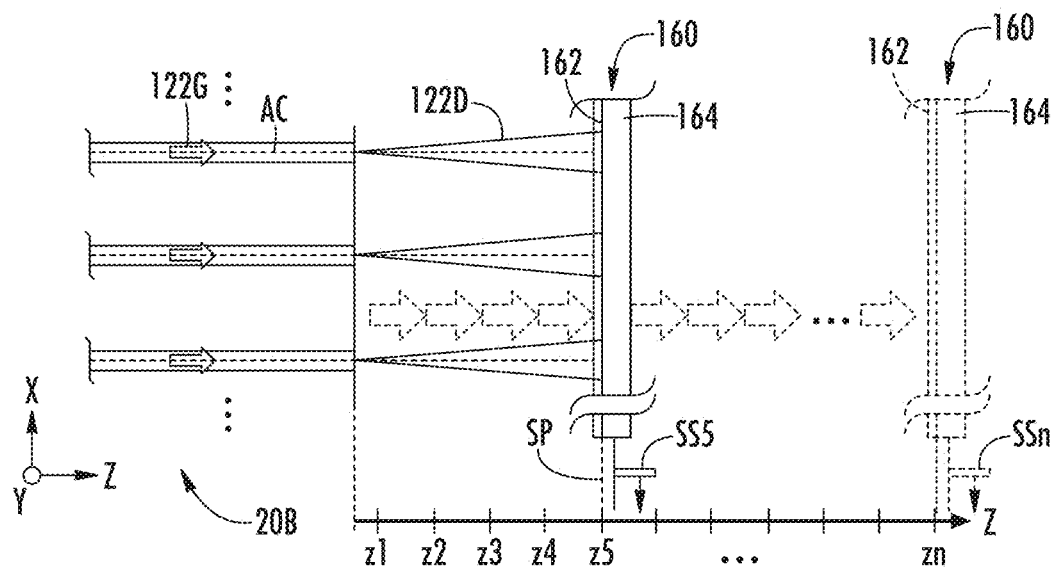

FIGS. 3A and 3B are close-up schematic diagrams of the output end of the system 100 showing for ease of illustration just the output connector 20B and the sensor device 160. As seen in FIGS. 3A and 3B, the guided wave 122G eventually reaches the output end face 32B of the jumper fiber 30, where it is emitted as a diverging light beam 122D.

The movable stage 170 (see FIG. 2) is used to place the sensor device 160 (or more accurately, the sensor array plane SP) at select axial distances or z-positions (z1, z2, . . . zn) away from the output end 22 (e.g., end surface 24 of ferrule 26) of the output connector 20B. The term "axial distances" (or "axial positions") is used since the z-axis is substantially parallel to the centerlines AC (i.e., central axes) of jumper fibers 30. In an example, the movable stage 170 moves the sensor device 160 in increments of Δz, which in example can be in the range from 10 μm to 100 μm. The overall range RM of movement of the sensor device 160 in the z-direction can be defined as RM=zn−z1. In one example, z1=100 μm and zn=4000 μm so that RM=3900 μm. In an example, the range RM can be 1000 μm≤RM≤10000 μm.

Each illuminated jumper fiber 30 outputs a diverging output light beam 122D from its output end face 32B. The output light beam is detected by the sensor array 164 of the sensor device 160 at the select z-positions, e.g., from z1 to zn. FIG. 3A shows the sensor device 160 (sensor array plane SP) at a first z-position z1. FIG. 3B shows the sensor device 160 at a fifth z-position z5. FIG. 3B shows in phantom the incremental movement of the sensor device 160 between the different z-positions in increments of Δz.

Figure 4A:
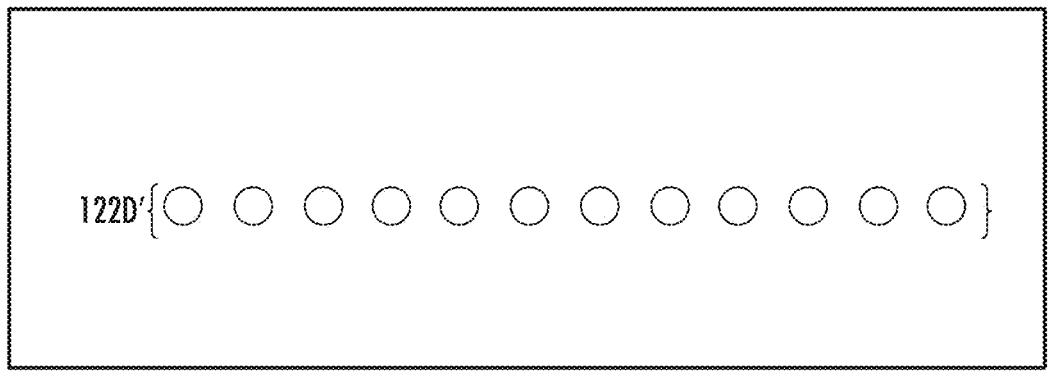
FIGS. 4A through 4C are idealized representations of output-beam images of the diverging output light beams emitted or outputted from the jumper fibers and as captured by the sensor device at three different measurement distances.
Figure 4B:
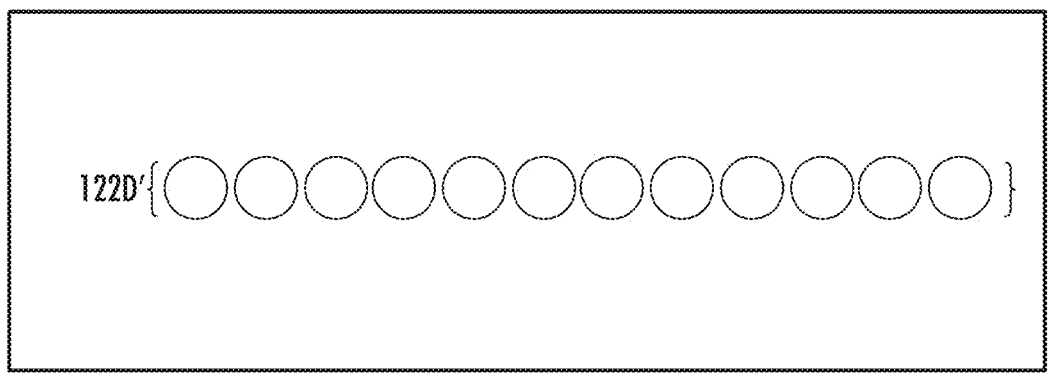
Figure 4C:
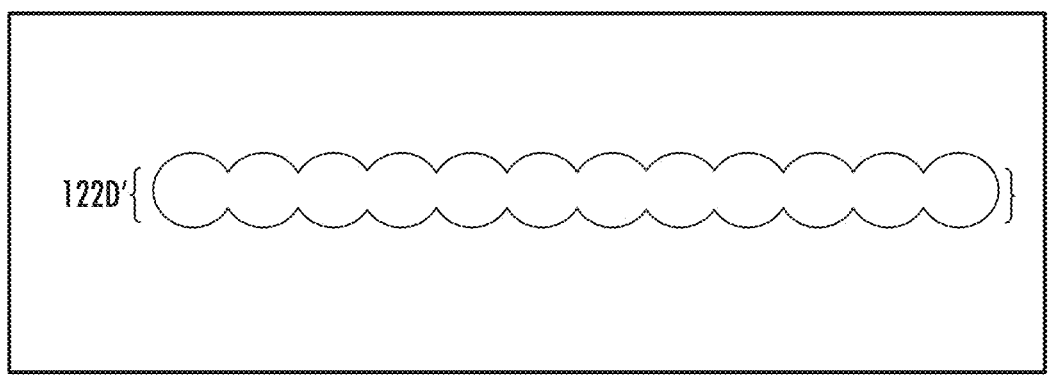

As noted above, the sensor signals SS are representative of the received output beams 122D at the different z-positions and correspond to intensity distributions of the detected output-beam images. FIGS. 4A through 4C are idealized representations of output-beam images 122D' of the diverging output light beams 122D emitted or outputted from the jumper fibers 30 and as captured by the sensor device 160 at three different measurement positions (i.e., three different z-positions or axial distances). The first z-position of FIG. 4A is closest to the output end 22 of the output connector 20B (i.e., z=z1). The second z-position of FIG. 4B is at an intermediate z-position (e.g., z=(z1+zn)/2). The third z-position of FIG. 4C is relatively far away from the output end 22 of the output connector 20B (e.g., z=zn). The output-beam images 122D' of FIG. 4C shows how the diverging light beams 122D can start to overlap at a sufficiently large (far) z-position. Consequently, capturing of output-beam images 122D' may require the use of the slit member 140 to isolate a single jumper fiber 30 or to isolate select jumper fibers 30 in a manner that avoids illuminating immediately adjacent jumper fibers 30 at the input end face 32A.

In an example, a background sensor image with the light source 120 turned off may be acquired for ambient light subtraction when processing captured output-beam images 122D, as discussed below. This process may be also performed in software in processor 180, e.g., by a spatial high-pass filtering operation.

Main Method Steps

The main method steps used for a first example of measuring the insertion loss using system 100 includes the following for each jumper fiber: 1) obtain at least one output-beam image 122D' for at least two different measurement positions, wherein as noted above the output-beam images have respective intensity distributions I(x, y; z); 2) perform curve fitting of the output-beam images to determine the main the beam parameters (maximum intensity $I_0$, a centroid location $(x_C(z), y_C(z))$ of the given intensity distribution, and a spot size w(z) for each measurement position and also determining the coordinates $(x_0, y_0, z_0)$ of the fiber end face 32 and the MFD=$w(x_0, y_0, z_0)$=$w_0$; 3) using the beam parameters of step 2) in a Gaussian field model applied to a reference connector to determine connector loss (i.e., insertion loss) due to mismatch, tilt error, and offset error.

The offset (i.e., offset error) is measured relative to an ideal location on the output end face 32B of the given jumper fiber 30 and the tilt error is measured to an ideal central axis AC. In an example, the ideal locations of the output end faces 32B are determined based on a perfectly linear array of jumper fibers having a perfect center-to-center spacing (e.g., 250 µm). In the absence of connector alignment pin geometry information, a best-case estimate is performed by positioning the ideal array of jumper fibers 30 to achieve the lowest possible loss given the measured fiber locations.

In an example, the ideal central axes AC are taken as being parallel to the z-axis. In another example, each jumper fiber 30 is assumed to have a central axis AC defined by an average beam direction for the output beams. In an example discussed below in connection with FIGS. 11A and 11B, the central axes AC are assumed to be defined by respective beam axes 200-1, 200-2, . . . 200-N, each formed by a line passing through the centroids of the different output-beam images 122D' from the given jumper fiber 30.

Each of these main steps is now discussed in greater detail below. In an example, some or all of the steps can be performed in processor 180 using known mathematics software, such as MATLAB® math software from The MathWorks, Inc., Natick, Massachusetts.

1. Capturing Output-Beam Images

In an example, one or more multiple output-beam images 122D' are captured by the sensor device 160 at each axial measurement position z. The minimum number of axial measurement positions z is two. In an example, multiple output-beam images 122D' are captured at a given axial measurement position z and are then averaged to obtain an average output-beam image for the given axial measurement position. In an example, before averaging, each of the output-beam images 122D' is converted to a double-precision image using techniques known in the art of digital image processing (e.g., using MATLAB® software). Also in an example, a black level is optionally subtracted from the average output-beam image. Because averaging is a linear operation, the black-level subtraction operation can be performed in the fitting step discussed below.

Depending on how the average output-beam image 122D' is stored, it may be necessary to subtract a constant value from the image files. For example, if a 12-bit image is stored in a 16-bit file format as the 12 most significant bits, it is necessary to subtract a constant $2^4$=16 from the file. Otherwise its smallest possible value would be 16 instead of zero. Ideally, the image intensity would fall to zero at the edges, far from the optical beam. But because of stray light, there is likely some non-zero dark level. It should also be subtracted from the data to facilitate fitting. There are different techniques for subtracting the black level. One possibility is to average the intensity of the output-beam image around the border (with a width 5 pixels, for example) and use that as the zero level.

Another option is to use a Gaussian blur filter to blur the image over a large number of pixels (relative to the spot size of beam), and then subtract this blurred image from the original image. This may be useful if the stray light level varies slowly across the image area, so that a constant black level is inappropriate. It is essentially a spatial high-pass filter. After this filter is applied, a constant subtraction can also be performed to bring the outer boundary of the image to zero intensity.

2. Curve Fitting to Obtain Beam Parameters

The second main step of the method involves performing curve fitting to the average output-beam image to obtain the maximum intensity $I_0$, the black level BL, the centroid location $(x_C(z), y_C(z))$ and the spot size w(z) for each measurement position (z-positions). In an example, the fitting parameters are the maximum beam intensity $I_0$, the beam width w, and the x- and y-coordinates $x_0$ and $y_0$ that correspond to the (x,y) coordinates at z=$z_0$, which is the axial z position of the end face 32 of the jumper fiber 30. In this step, one can also fit a black level if it was not already removed in the previous step.

To be clear, the spot size w(z) is an expression of the beam radius w as function z-position. Thus, at a given z-position, the terms "spot size" and "beam radius" are interchangeable, both referring to the maximum distance from a center of the beam, as measured in a plane normal to the beam axis at the z-position.

In example, the curve fitting process is based on a Gaussian curve. The Gaussian fitting process includes performing a Hough transform to identify the approximate location and diameter of the average output-beam image 122D'. The values obtained in this manner are approximate but sufficient to locate the output-beam image in the larger captured image. The obtained values for location and diameter of the average output-beam image are used as initial values for beam fitting.

The beam intensity maximum value Jo is initially taken to be the largest value of intensity over either all of the pixels of the average output-beam image or a sub-set of pixels known to contain the maximum value. Because the image is pixelated, this value may not actually the intensity maximum. An example of the Gaussian curve-fitting form for the intensity profile $I_{fit}$ of the output-beam image is:

$$I_{fit}(x, y) = BL + I_0 \exp(-((x-x_0)^2 + (y-y_0)^2)/w^2). \quad \text{E-1}$$

An error function E is defined by summing over pixel locations (x,y) as follows:

$$E = \sum_{x,y} |I(x, y) - I_{fit}(x, y)|^2 \quad \text{E-2}$$

The error function E is then minimized by taking derivatives with respect to the fitting parameters and finding their zeros.

An initial fit of w, $x_0$, and $y_0$ is then performed by finding the zeros of the aforementioned derivatives of E. For example, solving $\neq E/\neq x_0 = 0$ gives an estimate of the best value of $x_0$. A five-dimensional minimization of the error function E is then performed to extract the best estimate for the (fitting) parameters $I_0$, BL, w, $x_0$ and $y_0$.

Centroid measurement errors can be reduced by taking multiple measurements at each of the different measurement positions. An error analysis was performed and it was found that for a Gaussian spot size $w_G$=3.76 mm, a 0.26 μm offset is sufficient to cause a 0.02 dB loss. In this case, achieving a measurement accuracy of 0.26 μm would require: a) a 0.12 μm centroid accuracy and two CCD measurements; a 0.25 μm centroid accuracy and five CCD measurements; a 0.38 μm centroid accuracy and ten CCD measurements; a 1.00 μm centroid accuracy and 61 CCD measurements. Simulations showed that the averaging process produces a ten-times tighter distribution in the computed centroid location. It was also found that the centroid position variance can be up to about 100 times smaller with averaging than without.

2a. Adjusting the Beam Parameters in the Case of Beam Tilt

The spot size w(z) depends on the distance d the output beam 122D travels from the output end face 32B of the jumper fiber 30 to the sensor device 160, and this distance is not necessarily the same as the z-coordinate distance from the output end face 32B (located at z=$z_0$) to the sensor device 160 if the path of the output beam 122D is tilted relative to the z-direction. This can happen, for example, if the output end face 32B of the jumper fiber 30 is angled, i.e., does not reside in a plane perpendicular to the fiber center line AC.

Figure 5A:
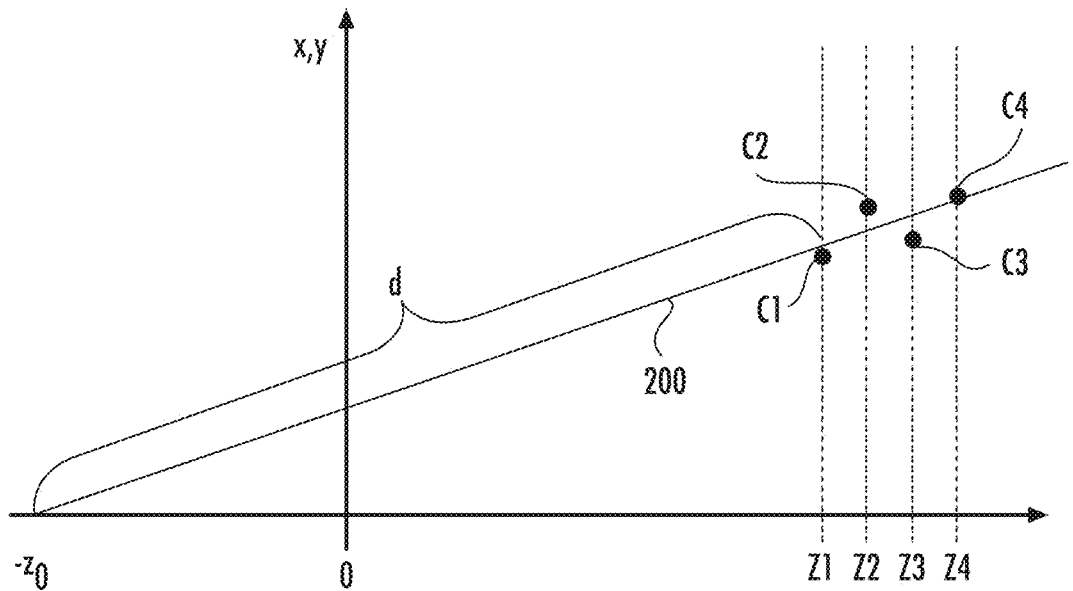
FIG. 5A is a Cartesian plot that illustrates how distance is measured from the output end of the jumper fiber to the sensor device when there is an amount of beam tilt.

FIG. 5A is a Cartesian plot that illustrates an example of how the distance d can be measured from the output end face 32B of the jumper fiber 30 to the sensor device 160 when there is an amount of beam tilt. The horizontal axis is the sensor device offset (z-coordinate), with the fiber end face 32B residing at an unknown location $-z_0$. The vertical axis represents transverse coordinates x or y in the plane of the sensor device 160. A number of measured beam centroids C1 through C4 for different offset values z1, z2, z3 and z4, respectively, are also shown. Note that in the case of no beam tilt, the centroids C1 through C4 would reside generally along the z-axis.

The distance d of the fiber end (at $(x_0, y_0, -z_0)$) to a given beam centroid BC located at (x,y,z) is given by:

$$d^2 = (x-x_0)^2 + (y+y_0)^2 + (z+z_0)^2 \quad \text{E-3}$$

A straight line (beam axes 200 in FIG. 5A) in 3-dimensional space is fitted through the measured centroid locations $(x_C(z), y_C(z))$. This line has the form:

$$x = m_x z + b_x$$

$$y = m_y z + b_y \quad \text{E-4}$$

Using equation E-4, equation E-3 can be re-expressed as:

$$d^2 = (z+z_0)^2(1+m_x^2+m_y^2). \quad \text{E-5}$$

Under Gaussian beam theory, the optical intensity of a beam has a transverse profile that can be described with a Gaussian function. From Gaussian beam theory, the beam radius should expand with d according to:

$$w^2 = \frac{w_0^2}{d_R^2}(d_R^2 + d^2) \quad \text{E-6}$$

where $w_0$ is the beam waist (smallest beam radius w of the Gaussian beam), and the length $d_R = \pi w_0^2/\lambda$ is the "Rayleigh range." By fitting $w^2$ to a quadratic polynomial in z, one can determine best-fit values for $w_0$ and $z_0$. Combining E-5 and E-6 yields:

$$w^2 = \frac{\lambda^2}{\pi^2 w_0^2}(d_R^2 + (1+m_x^2+m_y^2)(z+Z_0)^2) \quad \text{E-7}$$

$$= \frac{\lambda^2}{\pi^2 w_0^2}(d_R^2 + (1+m_x^2+m_y^2)(\sigma\zeta + \bar{z} + Z_0)^2)$$

The second equation in E-7 expresses the beam radius as a function of a scaled co-ordinate $\zeta$ related to z by $z = \sigma\zeta + \bar{z}$. The parameters $\bar{z}$ and $\sigma$ are the mean and standard deviation of the z-coordinate over the fitting range. This procedure improves the quality of the quadratic fit of $w^2$.

The $w^2$ data is then fitted to a quadratic in $\zeta$ as follows:

$$w^2 = \alpha\zeta^2 + \beta\zeta + \gamma \quad \text{E-8}$$

By scaling the z-coordinate in this manner, the obtained coefficients of this fit, $\alpha$, $\beta$, $\gamma$, should all have roughly comparable sizes. From these numbers, the beam parameters are obtained as follows:

$$w_0^2 = \frac{\lambda^2 \sigma^2}{\pi^2 \alpha}(1 + m_x^2 + m_y^2) \quad \text{E-9}$$

$$Z_0 = \frac{\pi^2 w_0^2}{2\lambda^2 \sigma} \cdot \frac{\beta}{1 + m_x^2 + m_y^2} - \bar{z}$$

$$X_0 = m_x Z_0 + b_x$$

$$Y_0 = m_y Z_0 + b_y$$

The mode-field diameter (MFD) can be determined from the slope of the spot size w(z) extrapolated back to the jumper fiber location at $-z_0$. The distance d is determined by finding the extrapolated z-intercept of the beam radius vs. z-location plot, i.e., by extrapolating the centroid positions to the beam waist location.

2b. Accounting for Non-Normal Incidence at the Sensor Device

The curve fitting method can be modified to account for when the output beam 122D is not normally incident upon the sensor device 160. The example method set forth below also includes a modification to the fitting procedure of the method described above in section 2a.

Figure 5B:
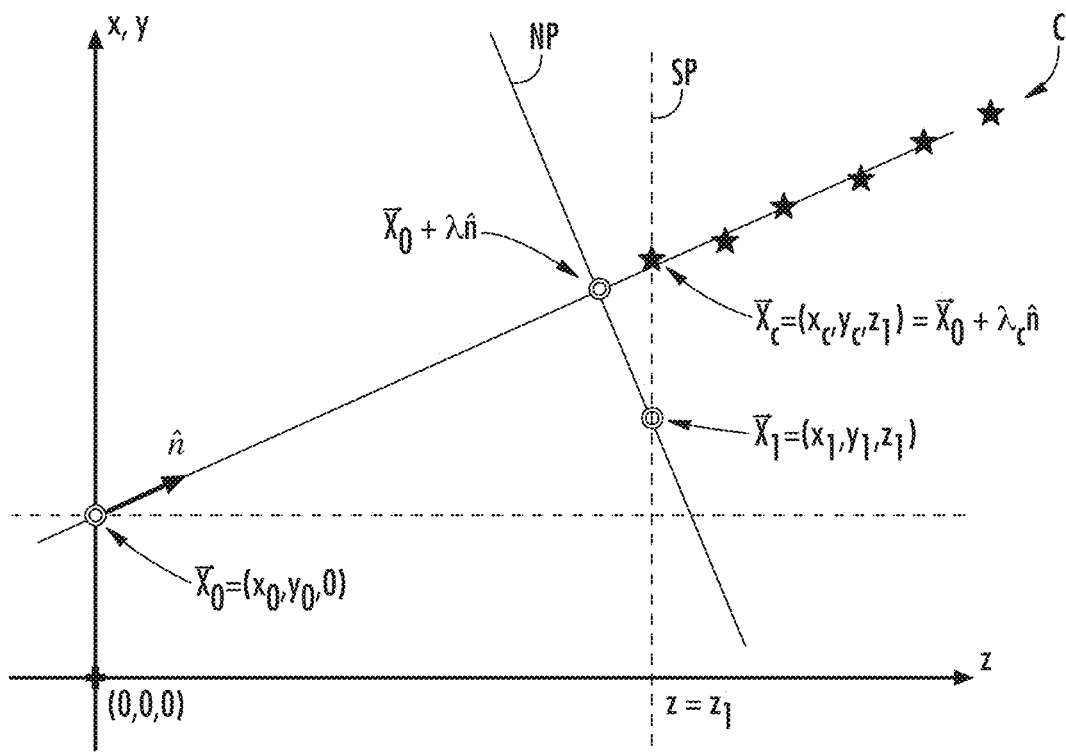
FIG. 5B is a Cartesian plot similar to FIG. 5A that is used to carry out a method that accounts for non-normal incidence of the output beam at the sensor device.

With reference to the coordinate system of FIG. 5B, the modification to the fitting procedure starts with the formula for the beam intensity I using Gaussian beam propagation with a coordinate system ($\xi$, $\eta$, $\zeta$) aligned with the output beam 122D. The propagation of the output beam 122D is in the ζ-direction (starting at $X_0 \times (0,0,0)$ in beam coordinates) and the beam intensity I is described by the equation $$I(\xi, \eta, \zeta; w_0, I_0, \xi_0, \eta_0) = I_0 \frac{w_0^2}{w(\zeta)^2} \exp(-2\rho^2/w(\zeta)^2) \quad \text{E-10}$$

where $$\rho = \sqrt{\xi^2 + \eta^2} \quad \text{E-11}$$

and $$w(\zeta)^2 = w_0^2 \left(1 + \frac{\lambda_0^2}{\pi^2 w_0^4} \zeta^2\right) \quad \text{E-12}$$

$w_0$ is the beam waist and $\lambda_0$ is the beam wavelength. In lab coordinates (x,y,z), the beam propagation direction is described by a unit vector n, as shown in FIG. 5B. There is a normal plane NP that is normal to the unit vector n (ζ=const.) which contains a point $X_1 = (x_1, y_1, z_1)$ and satisfies:

$$n_x(x-x_1) + n_y(y-y_1) + n_z(z-z_1) = 0 \quad \text{E-13}$$

As shown in FIG. 5B, the beam axis intercepts the normal plane NP at the point $X_0 + \lambda n$, where the length λ is given by $$\lambda = \hat{n} \cdot \vec{X}_1 - \vec{X}_0 \quad \text{E-14}$$

The point $X_1$ also lies on SP plane $z = z_1$ in lab coordinates.

The modified fitting steps can thus be summarized as follows:

1) From multiple sensor device locations, capture grayscale output-beam images 122D' (optionally averaging several images together at each location for noise reduction) and normalize the images to have a peak numerical value of one.

2) At each position, determine the location of corresponding centroid C in the lab coordinate system, $X_C = (x_C, y_C, z_C)$. The centroids C are determined simply as the intensity weighted average of x- and y-coordinates, without any additional assumptions about the beam shape.

3) Find the best fit lines describing the centroid evolution as a function of z. This yields the slopes:

$$m_x = \frac{dx_C}{dz}, m_y = \frac{dy_C}{dz}. \quad \text{E-15}$$

The unit vector n is then given by:

$$\hat{n} \approx \frac{(m_x, m_y, 1)}{\sqrt{1 + m_x^2 + m_y^2}} \quad \text{E-16}$$

4) Using all data together, find the parameters ($w_0, x_0, y_0, z_0$) that give the best overall fit of the data to the following function, derived from equation E-10:

$$I(x, y, z; w_0, x_0, y_0, z_0) \approx \frac{w(\lambda_C(z))^2}{w(\lambda)^2} \exp\left(-\frac{2\left(\left(\vec{X} - \vec{X}_0\right)^2 - \lambda^2\right)}{w(\lambda)^2}\right). \quad \text{E-17}$$

The fit is performed using a nonlinear minimization of an error function (eqn. E-2, above). Here X=(x,y,z), $$\lambda_C(z) = \hat{n} \cdot (\vec{X}_C(z) - \vec{X}_0) \quad \text{E-18}$$

and $X_0$ is the location of the beam waist. The lab z-coordinate is described by $$z = z_0 + N \Delta z \quad \text{E-19}$$

where $z_0$ is one of the parameters to be found, N=0, 1, 2, ... and Δz is the spacing between adjacent sensor device positions, presumed known.

This method differs from that set forth above in section 2a in that the present method does not find a beam radius as a function of z and then extrapolate back to find the waist location. It does not require separate fitting of every image using a Gaussian model. Instead, the present example method fits the entire beam at once.

The approximate equalities in equations E-16 and E-17 assume that the measured centroid locations C lie on the beam axis, and hence determine n. In practice, the centroid C is offset slightly from the beam axis because of the relative tilt of the output light beam 122D with respect to the sensor device plane SP. However, the centroid offset is negligible for the milliradian amounts of tilt expected. That said, the centroid offset can be virtually eliminated using the following method:

1) Find n from centroids and then fit images to obtain ($w_0, x_0, y_0, z_0$) as described above.

2) Using obtained ($w_0, x_0, y_0, z_0$), re-fit the images to obtain improved n components.

3) Use the revised n components to re-fit the images again for improved ($w_0, x_0, y_0, z_0$) values.

4) Iterate further as needed to obtain desired precision.

2c. Use Gaussian Field Model to Predict Insertion Loss

At this point in the example method, a Gaussian field model is used to predict the connector loss (insertion loss) due to mismatch, tilt and offset errors. The Gaussian field model is discussed for example, in the publication by D. Marcuse, "Loss analysis of single-mode fiber splices," Bell Sys. Tech. J. 56, 703-718. 1977, and in the publication by S. Nemoto, T. Makimoto, "Analysis of splice loss in single-mode fibers using a Gaussian field approximation," Opt. Quant. Electronics 11, 447-457, 1979, and in the publication by C. M. Miller, "Single-mode fiber splicing, OFC 1984, 44-45," each of which is incorporated by reference herein.

The Gaussian field model combines the loss due to the gap, the tilt, and the offset according to the following relationship:

$$\eta = (4\sigma/q) \exp(-pu/q), \quad \text{E-20}$$

where $$\sigma = (w_{G2}/w_{G1})^2$$

$$p = 2(\pi n_{gap} w_{G1}/\lambda)$$

$$q = \left(\frac{z_{gap}}{\pi n_{gap} w_{G1}^2/\lambda}\right)^2 + (\sigma + 1)^2$$

$$u = (\sigma + 1)\left(\frac{s}{\pi n_{gap} w_{G1}^2/\lambda}\right)^2 +$$

$$2\sigma s z_{gap}\left(\frac{1}{\pi n_{gap} w_{G1}^2/\lambda}\right)^2 \sin\theta + \sigma\left(\left(\frac{z_{gap}}{\pi n_{gap} w_{G1}^2/\lambda}\right)^2 + \sigma + 1\right)\sin^2\theta$$

where s is the radial offset, $z_{gap}$ is the gap distance, σ−1 is the mismatch parameter and θ is the tilt angle.

EXAMPLES

Figure 6A:
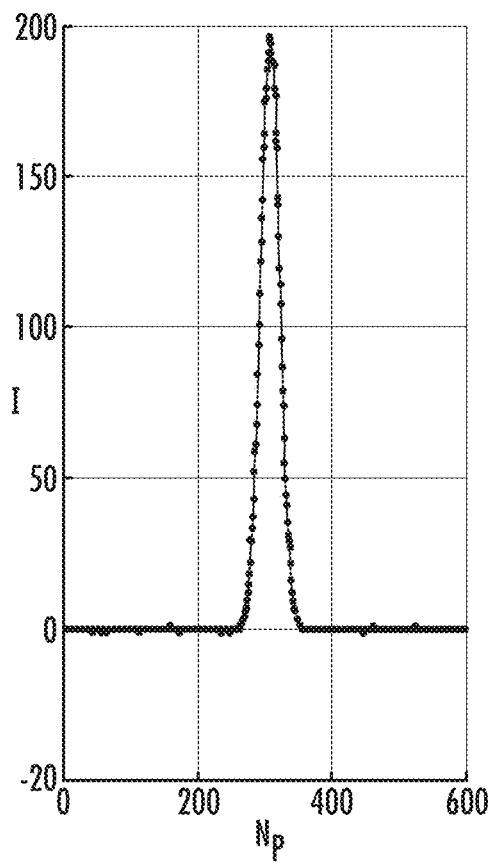
FIGS. 6A and 6B are plots of the measured relative intensity I (x-coordinate) versus a number $N_P$ of pixels (y-coordinate) of an output-beam image from a single-mode jumper fiber and for a measurement distance of $z=100$ μm.
Figure 6B:
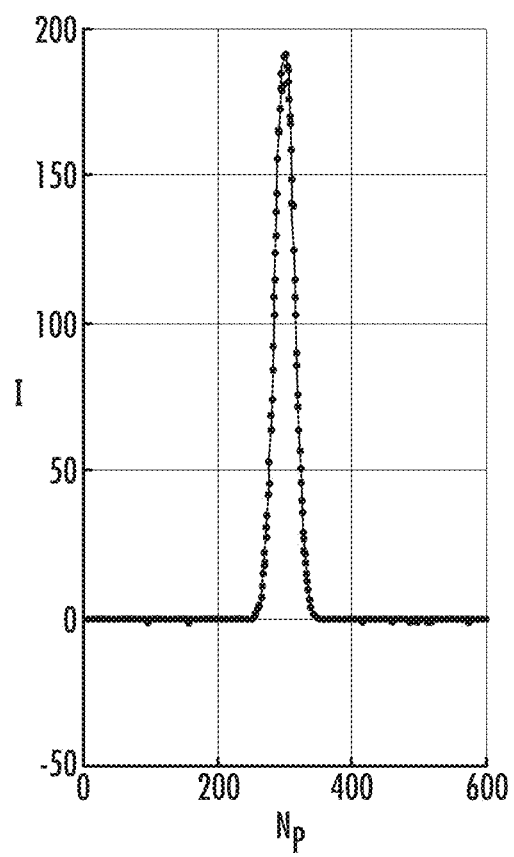

FIGS. 6A and 6B are plots of the measured relative intensity I versus the x-coordinate and the y-coordinate (in the number $N_P$ of pixels) of an output-beam image 122D' from a single-mode jumper fiber 30 according to a first example. The wavelength $\lambda_0$ of the light 122 used was 940 nm. In FIGS. 6A and 6B, the sensor device axial distance (i.e., measurement position) was z=100 µm.

Figure 7A:
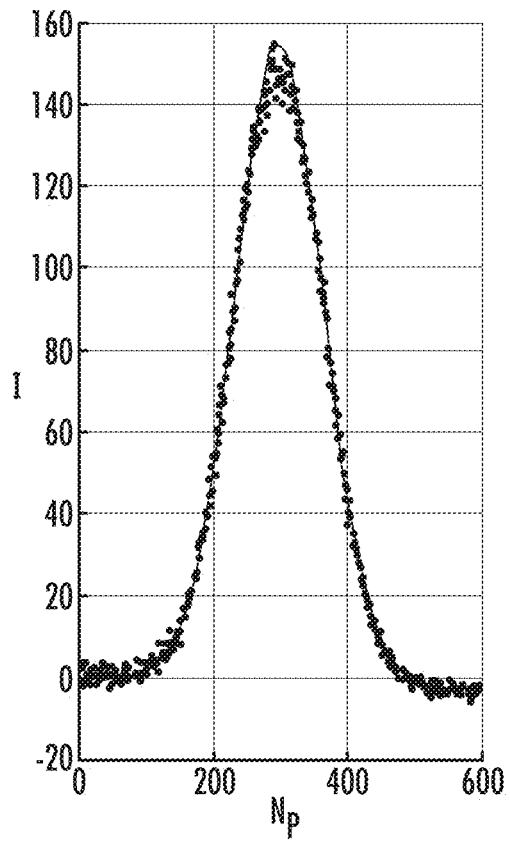
FIGS. 7A and 7B are the same plots as FIGS. 6A and 6B but for a measurement distance of $z=4000$ μm.
Figure 7B:
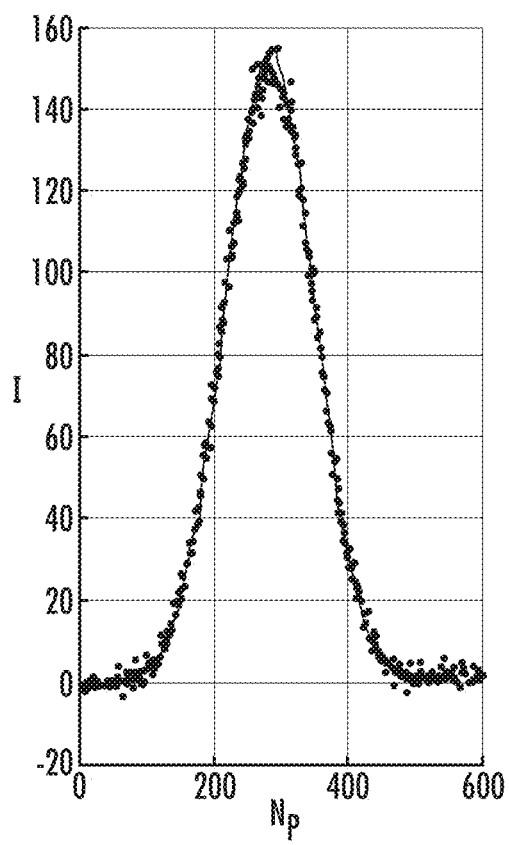

FIGS. 7A and 7B are the same plots as FIGS. 6A and 6B but for the sensor device axial distance z=4000 µm. For the example sensor device 160 used, the size of each pixel 166 was 3.45×3.45 µm.

Figure 8:
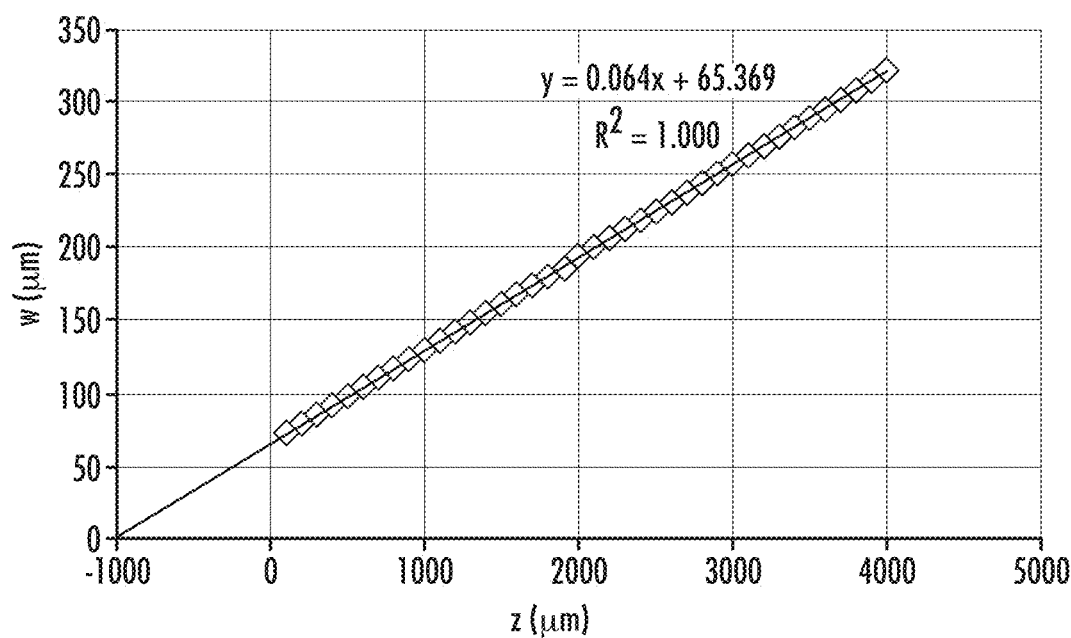
FIG. 8 is a plot of beam width w (μm) as calculated using a Gaussian fitting process versus the measurement distance z (μm).

FIG. 8 is a plot of the beam width w in microns (µm) as calculated using the Gaussian fitting process described above versus the sensor device distance z (µm). The plot of FIG. 8 indicates a negative position of about −1000 µm for the beam-waist. As mentioned, this is because the effective imaging plane of the sensor array 164 of the sensor device 160 used resided below an air layer and cover sheet 162 of thickness 0.7 mm. Thus, a zero measurement distance corresponds approximately to the point where the fiber end face 32B is just touching the cover glass 162.

Gaussian functions fit the data reasonably well. At 940 nm, the Rayleigh range of the beam is approximately 120 µm, which is quite small compared to the z-distances used in making the measurements. Hence the data of FIG. 8 is very well approximated by a straight line. By plotting the measured beam width w(z) as a function of the measurement distance z, the location of the beam waist $w_0=w(z_0)$ can be determined by extrapolating the slope of the beam width plot to the w(z)=0 location (see FIG. 8). This locates the fiber end face 32B. Then, with the measured centroid data and beam width data, the absolute location of the fiber end face 32B and the tilt angles of the output beam 122D can be obtained. The size of the beam waist is taken as the MFD, which can then be used to estimate MFD errors relative to a reference fiber 30R.

Figure 9A:
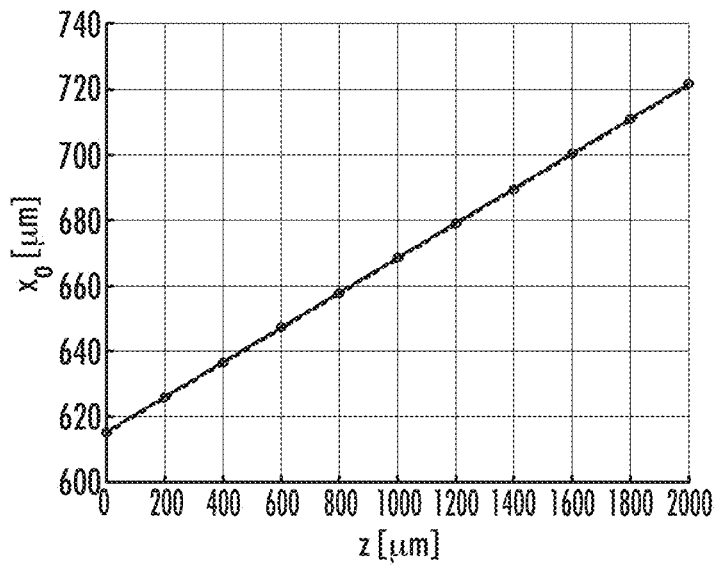
FIGS. 9A and 9B are plots of the beam parameters $x_0$ (μm) and $y_0$ (μm) versus the z position (μm)
Figure 9B:
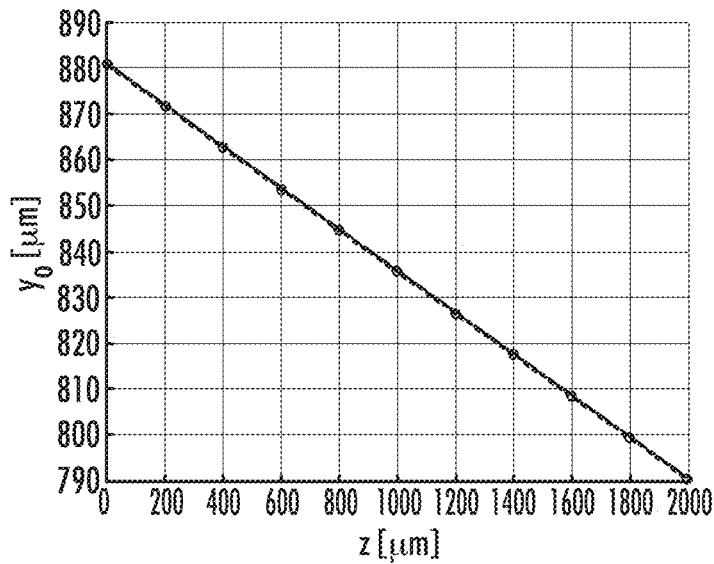
Figure 9C:
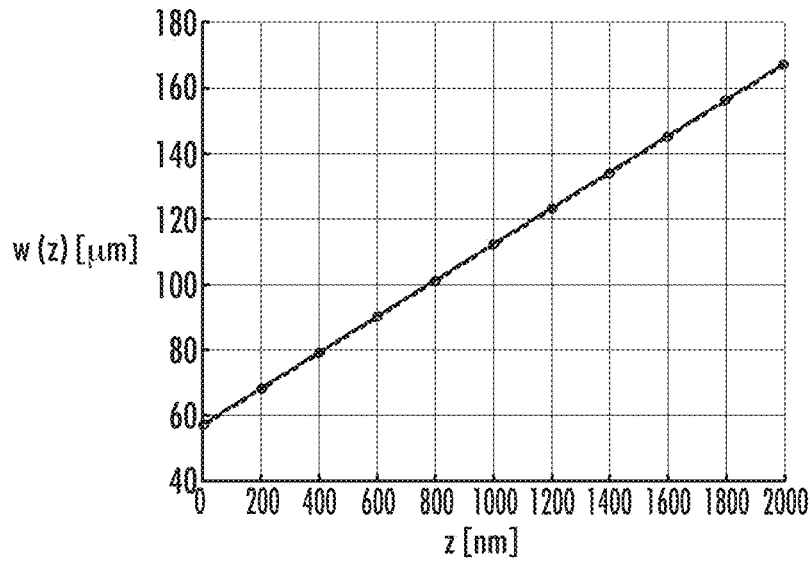
FIG. 9C is a plot of the spot size w(z) (μm) versus the z position for a second example.

FIGS. 9A and 9B are plots of the beam parameters $x_0$ (µm) and $y_0$ (µm) versus the z-position (µm), and FIG. 9C is a plot of the spot size w(z) versus the z-position for a second example. Measurements were taken at measurement positions from z=0 to z=2 mm in increments of 0.2 mm. The beam waist location was determined to be at z=$z_0$=−1035.6+/−2.056 µm, with the ($x_0$, $y_0$) coordinates of the beam waist location from FIGS. 9A and 9B being $x_0$=560.234+/−0.367 µm and $y_0$=927.975+/−0.117 µm and the spot size (from FIG. 9C) being $w_0$=MFD= 5.4449+/−0.0070 µm.

Figure 10:
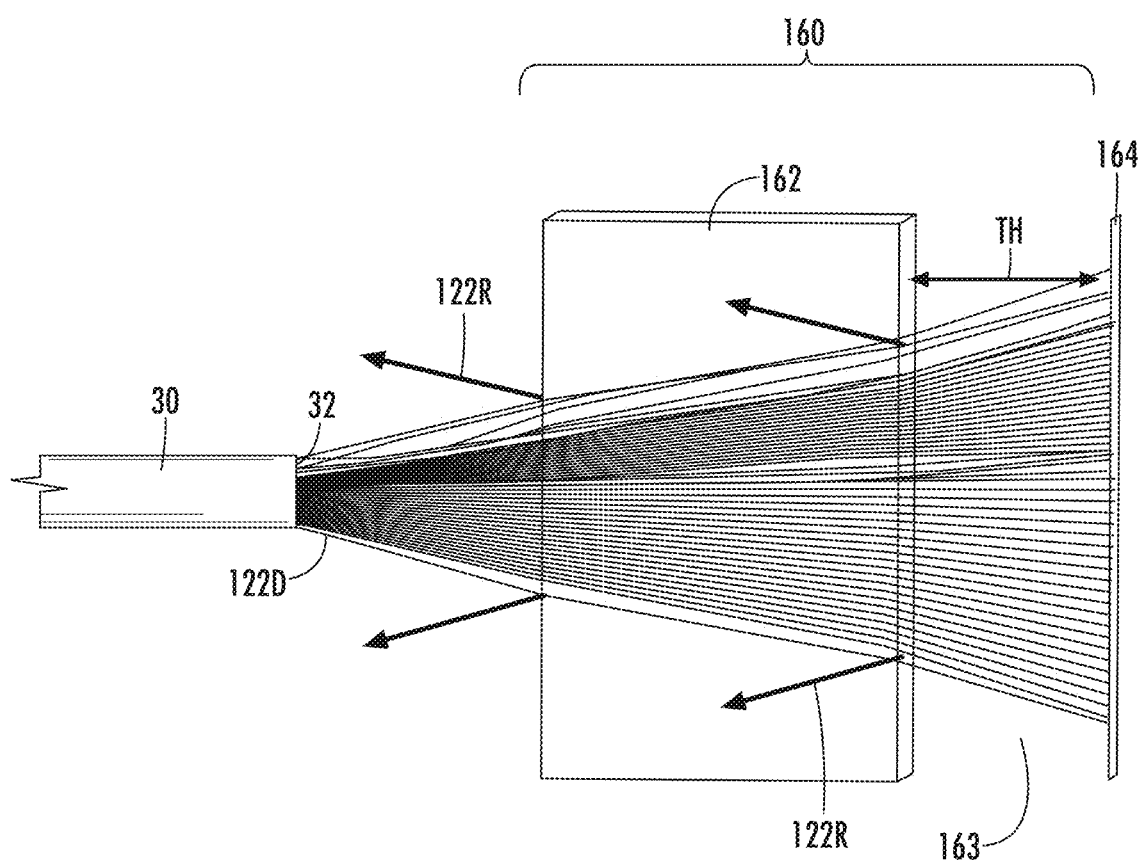
FIG. 10 is a close-up side view of the output end of a jumper fiber supported by an output connector of a jumper cable, and an example sensor device that includes a cover sheet and an air space, illustrating using ray tracing how an output beam is altered by the cover glass in front of a sensor array.

FIG. 10 is a close-up side view of the end of the jumper fiber 30 that includes the output end face 32B along with an example sensor device 160 that includes the cover sheet 162 and the sensor array 164. There is an air space 163 between the cover sheet 162 and the sensor array 164. The thickness TH of the air space 163 can be about 0.4 mm while the thickness of the cover sheet 162 can be about 0.7 mm. FIG. 10 also shows the output light beam 122D as determined by ray tracing. The ray tracing shows that the presence of the cover sheet 162 has the effect of making the beam width of output-beam image 122D appear smaller than its actual size. The effect is more pronounced when the beam waist is very close to the cover sheet 162. Note also that there is loss due to reflections, as shown by reflected light 122R. Knowing the thickness and refractive index of the cover sheet 162, the size of the air space 163, and the measurement distance z allows for the calculations to be adjusted to compensate for this effect using standard geometrical optics. Alternatively, on some sensors, the cover glass 162 may be removed.

3. Plane Fitting Method

In the methods described above, the axial distance d from the sensor device 160 of the fiber end face 32 of a given jumper fiber 30 is obtained by studying the dependence of the spot size w(z) as a function of z position. Linear extrapolation of the spot size w(z) to the z coordinate where it vanishes gives the approximate location of the beam waist $w_0$, which is taken as the fiber end-face location $z_0$. Once this coordinate is determined, the measured beam centroid coordinates X(Z), Y(Z) are extrapolated to X($Z_0$), Y($Z_0$)= ($x_0$, $y_0$). This locates the given jumper fiber 30 (fiber end face 32) in the (x,y) dimensions transverse to the axis of the sensor device motion.

In practice, there can be some uncertainty in the $z_0$ location using the above-described method, which is likely due to challenges in accurately determining the beam width w(z). In some cases, the variability in the fiber end face location $z_0$ can be several tens of microns. Thus, in one example, using the average $z_0$ measured over all jumper fibers 30 in the jumper connector 20 can yield more accurate values for the fiber positions X($z_0$) and Y($z_0$).

In another example referred to in this disclosure as the plane fitting method, the end face z-coordinates $z_0$ for the jumper fibers 30 are determined without using spot sizes w(z) of beams. Instead, with reference to FIG. 11A, the measured centroids C and their locations for the various (N) jumper fibers 30 are determined as described above (see, e.g., sections 2a and 2b) and are used to define a set of N beam axes 200, i.e., 200-1, 200-2, . . . 200-N. In an example, multiple output-beam images 122D' (e.g., FIGS. 4A-4C) are averaged at each axial location z for each jumper fiber 30 to improve the accuracy of the centroid calculation as described above.

The N beam axes 200-N are lines in space that intersect a plane 210, which in an example is initially positioned at an estimated location of the fiber end faces 32, e.g., at an estimated location of the end surface 24 of ferrule 26. The plane 210 includes a set of intersection points P (P1, P2, . . . PN) defined by the local (x, y, z) coordinates where the set of N beam axes 200-1, 200-2, . . . 200-N intersect the plane 210. Note that the beam axes 200 can also be interpreted as the centerlines AC of the jumper fibers 30.

The intersection points P1, P2, . . . PN have coordinates ($x_1$, $y_1$, $z_1$), ($x_2$, $y_2$, $z_2$), . . . ($x_N$, $y_N$, $z_N$) and are interpreted to represent estimated fiber end-face locations $z_0$ for each jumper fiber 30. Of course, there will be infinitely many such planes 210 and the end face locations are not yet known with accuracy. FIG. 11B includes example planes 210 at different z-positions z1 through z5 and showing by way of illustration six different intersection points P (P1 through P6) for each plane 210. The z-positions z1 through z5 are taken around what is thought to be $z_0$ rather than all being on one side of $z_0$ in contrast to some of the examples discussed above. Adjacent intersection points P have a spacing DS. The nominal or ideal spacing is D (see FIG. 11B, plane 210-3).

The plane 210 of interest, and the one that best corresponds to the best estimate of the positions of the fiber end faces 32 (and thus the "optimum plane") is the one where the deviations of the different spacings DS between adjacent computed intersection points P (($x_2$−$x_1$, $y_2$−$y_1$), etc.) from the nominal (or ideal) value D (for a constant spacing) are minimized, i.e., the spacings DS are closest to the nominal spacing D. In FIG. 11B, the plane denoted 210-3 is the optimum plane 210 because the set of intersection points P1 through P6 have the minimum spacing, so that the z-position z=z3 of this plane can be set to be $z_0$. In plane 210-3, the nominal spacing D is shown for reference.

The optimum plane 210 is found as follows. For each fiber k, the following quantities are defined by equation E-21:

$$x^{(k)} = m_x^{(k)} z + b_x^{(k)}$$

$$y^{(k)} = m_y^{(k)} z + b_y^{(k)}$$

$$0 = \alpha\, x^{(k)} + \beta\, y^{(k)} + \gamma\, z + \delta \qquad \text{E-21}$$

The first two equations of equation E-21 describe the x- and y-locations of the $k^{th}$-beam centroid at any z-coordinate using experimental parameters $m^{(k)}$ and $b^{(k)}$ determined from the centroid location measurements. The third equation is the plane equation, with $\alpha$, $\beta$, $\gamma$, $\delta$ being the plane parameters to be determined.

Rewriting equation E-21 in matrix form yields equation E-22:

$$\begin{pmatrix} \alpha & \beta & \gamma \\ 1 & 0 & -m_x^{(k)} \\ 0 & 1 & -m_y^{(k)} \end{pmatrix} \begin{pmatrix} x^{(k)} \\ y^{(k)} \\ z^{(k)} \end{pmatrix} = \begin{pmatrix} -\delta \\ b_x^{(k)} \\ b_y^{(k)} \end{pmatrix} \qquad \text{E-22}$$

which yields the following solution (equation E-23) for the $k^{th}$ fiber end-face coordinates (end face positions):

$$\begin{pmatrix} x^{(k)} \\ y^{(k)} \\ z^{(k)} \end{pmatrix} = \frac{1}{\alpha m_x^{(k)} + \beta m_y^{(k)} + \gamma} \begin{pmatrix} m_x^{(k)} & \beta m_y^{(k)} + \gamma & -\beta m_x^{(k)} \\ m_y^{(k)} & -\alpha m_y^{(k)} & \alpha m_x^{(k)} + \gamma \\ 1 & -\alpha & -\beta \end{pmatrix} \begin{pmatrix} -\delta \\ b_x^{(k)} \\ b_y^{(k)} \end{pmatrix} \qquad \text{E-23}$$

To obtain the plane parameters $\alpha$, $\beta$, $\gamma$, $\delta$, an error function E of the distance between the points (inter-fiber spacings) is minimized, with the nominal inter-fiber spacing D being subtracted in a least squares fit minimization equation E-24:

$$E = \sum_{k=2}^{N} \left[ (x^{(k)} - x^{(k-1)})^2 + (y^{(k)} - y^{(k-1)})^2 + (z^{(k)} - z^{(k-1)})^2 - D^2 \right]^2, \qquad \text{E-24}$$

using the expressions for x(k), y(k), z(k) in equation E-23 and using the measured values for m and b. Once the plane parameters are determined, equation E-23 is used again to obtain the fiber end face coordinates ($x_0$, $y_0$) for each fiber 30 for the optimum plane 210.

The orientation of the plane 210 is not necessarily an accurate representation of the fiber-connector ferrule plane orientation. For example, in the case where the fiber end faces 32 lay exactly in a line, there would be infinitely many planes 210 that would intersect it and so orientation information would be available. In this unlikely case, if multiple planes 210 turn out to have the exact same fiber coordinates, the method can be terminated and the fiber coordinates determined from any one of the multiple planes 210.

If one of the jumper fibers 30 is slightly off line (e.g., has a y-offset) with respect to the others, it could completely determine the plane orientation. This extreme case shows that the orientation of the plane 210 (its normal vector) can be dominated by noise. Fortunately, this is not a problem because the computed plane 210 includes the line describing the fiber array in this case, so that the plane orientation is not actually required.

The plane fitting method provide the positions of the fiber end faces 32 of the array of jumper fibers 30 supported by the ferrule 26 of the jumper connector 20. In an example, it also provides an estimate of the z-position of the end surface 24 of the ferrule 26.

An advantage of the plane fitting method is that it is applicable to multimode fibers 30 since the method does not employ spot size calculations based on Gaussian mode propagation of single (fundamental) mode light beams. Another advantage of the plane fitting method is that it accounts for both angular and lateral offsets.

Once the positions of the fiber end faces 32 are known, the insertion loss when connecting to a connector with reference fibers 30R can be determined. For single mode jumper fibers 30, the above-described beam-propagation methods can be employed.

Monte-Carlo Method for Multimode Fiber Insertion Loss

As noted above, beam propagation methods for determining connector insertion loss are suitable for single mode fibers but problematic for multimode fibers.

Consequently, the disclosure includes a method for estimating insertion loss for connectors that support multimode jumper fibers 30, wherein the positions of the end faces 32 of the multimode jumper fibers 30 are determined using the plane fitting method.

The method for estimating the insertion loss include performing ray tracing rather than Gaussian beam propagation. Uncertainties in one or more of the main connector parameters, such as the relative refractive index (usually denoted $\Delta$) of the jumper fiber core, the fiber core diameter and alpha parameter (which defines the refractive index profile of the core) are modeled as error distributions for the Monte-Carlo simulations rather than having fixed values.

FIG. 12A is a schematic diagram of an example fiber optical system 300 that represents representative or "effective" system configuration for the modeling of the multimode fiber insertion loss using a multimode test jumper fiber 30 of the same type used in the jumper connector 20 to be measured, and a multimode reference jumper fiber 30R. The fiber optical system 300 includes a light source 120 that emits light 122, which can be divergent light 122D. A beam-conditioning optical system 130 converts the emitted light 122 into focused light 122F. The focused light 122F has a numerical aperture (NA) that is greater than NA of the test jumper fiber 30 so that the overfilled coupling condition is satisfied. The test jumper fiber 30 has a centerline AC while the reference jumper fiber 30R has a centerline AC'. The test jumper fiber has input and output end faces 32A and 32B while the reference jumper fiber 30R has input and output end faces 32A' and 32B'. The output end face 32B of the test jumper fiber 30A is interfaced with the input end face 32A' of the reference jumper fiber with their respective centerlines offset by an amount $\delta r$. The test jumper fiber 30 and the reference jumper fiber 30R can also have an angular offset $\delta\theta$, as shown in the close-up inset IN of FIG. 12A. Thus, the term "offset" can be mean at least one of a lateral offset $\delta r$ and an angular offset $\delta\theta$.

A light collection system 330 is arranged adjacent the output end face 32B' of the reference jumper fiber 30R. The light collection system collects divergent light 122D outputted from the reference jumper fiber 30R and directs it to a sensor device 160.

Figure 12B:
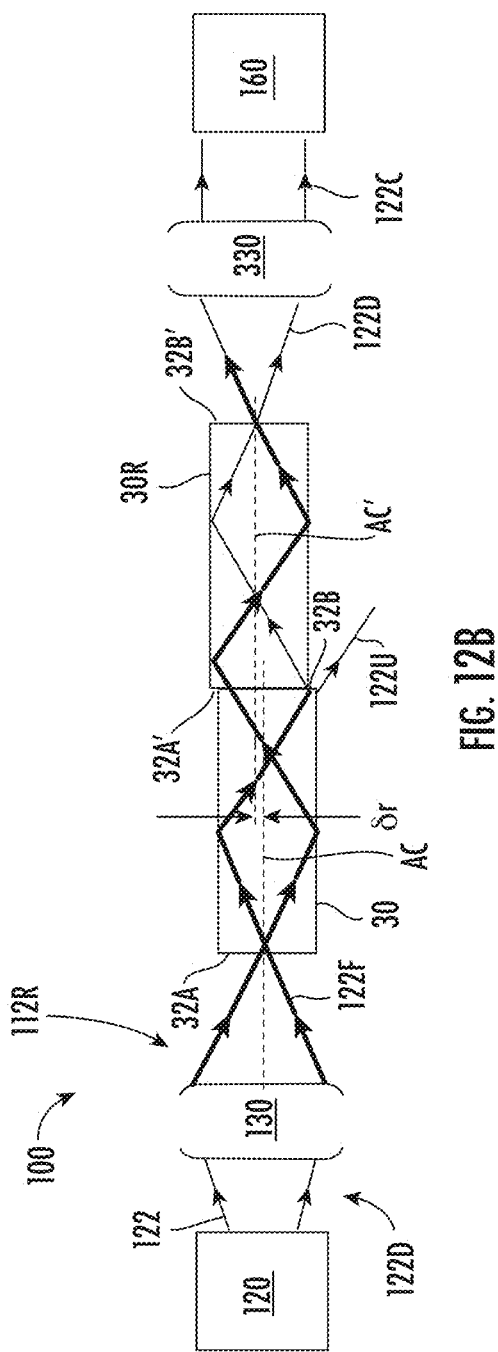
FIG. 12B is similar to FIG. 12A and shows example traced rays, including an uncoupled light ray due to the offset between the input fiber and the reference fiber.

FIG. 12B is similar to FIG. 12A and shows example traced light rays 122. For the simulation/modeling, the light rays for the light 122 ("light rays 122") are traced from the light source 120 with the output end face 32B of the jumper fiber 30 butt-coupling to the input end face 32A' of the reference jumper fiber 30R. If the amount of light outputted from the test jumper fiber 30 is $I_{IN}$ and the amount coupled into the reference jumper fiber 30R is $I_{OUT}$, then the insertion loss IL=$I_{IN}/I_{OUT}$. FIG. 12B shows an example of an uncoupled light ray 122U due to the offset δr. Uncoupled light rays 122U result in the outputted divergent light 122D having less intensity, as schematically represented by the change in thickness of the traced light ray 122.

In one example, the ray tracing can be performed based on the measured end face positions of the test jumper fibers 30 found using the plane fitting method to arrive directly at an estimate of the insertion loss for the measured test jumper connector 20.

Look-Up Table Method

In an example, ray tracing is performed for a series of offsets δr (where r is a radial coordinate) between the central axes AC and AC' and the amount of light 122 that coupled into reference jumper fiber 30R (and assumed transmitted to the sensor device 160 without any further loss) is calculated. Then, once the positions of the end faces 32 of the test jumper fibers 30 are measured using the plane-fitting method, the offsets defined by the end face positions can be compared to the offsets δr in a look up table, where r is a radial coordinate. The ray tracing can also be performed for a series of angular offsets as well as a combination of angular and lateral offsets.

Table 1 below is an example look-up table formed based on carrying out the Monte-Carlo ray-tracing simulation methods for an example test jumper fiber 30 and an example reference fiber 30R for example lateral offsets δr. Interpolation can be used for measured offsets that fall between offsets δr values in the look-up table.

TABLE 1

Example Look-up Table

| OFFSET δr (μm) | INSERTION LOSS LI (dB) | |
|---|---|---|
| | MEAN | +/− 2σ |
| 0.0 | 0.003 | +0.007/−0.003 |
| 0.5 | 0.014 | +0.022/−0.012 |
| 1.0 | 0.030 | +0.030/−0.018 |
| 1.5 | 0.048 | +0.032/−0.025 |
| 2.0 | 0.069 | +/−0.035 |
| 2.5 | 0.091 | +/−0.038 |
| 3.0 | 0.116 | +/−0.042 |
| 3.5 | 0.142 | +/−0.046 |
| 4.0 | 0.171 | +/−0.050 |
| 4.5 | 0.202 | +/−0.054 |
| 5.0 | 0.236 | +/−0.058 |
| 5.5 | 0.274 | +/−0.062 |
| 6.0 | 0.315 | +/−0.066 |
| 6.5 | 0.361 | +/−0.070 |
| 7.0 | 0.412 | +/−0.074 |

The ray-tracing can be carried out for any launch condition, but the overfilled launch condition is believed to be the most stable and provide the most reliable and accurate results. A restricted loss launch condition that excited fewer than all the available modes can be affected by bend losses that can couple light from lower-order modes into high-order modes.

In practice, insertion loss measurements can be made on multimode fiber connectors using the fiber end face positions obtained using the plane fitting method described above and then modeling the insertion loss using the Monte-Carlo raytracing method or by using the angular and/or lateral offsets of the fiber end face positions (relative to those of a reference fiber 30R) to obtain an estimate of the insertion loss.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A non-contact method of predicting an insertion loss of a test optical fiber connector that includes at least one optical fiber having an output end face, comprising:
    a) sending light down the at least one optical fiber in substantially only a fundamental mode and emitting the light from the output end face as an output light beam;
    b) for each of two or more measurement positions at different axial distances from the output end face, capturing at least one output-beam image using a sensor array to define two or more output-beam images associated with the two or more measurement positions;
    c) fitting a Gaussian curve to the two or more output-beam images to determine a mode field diameter (MFD), an offset, and a tilt of the output light beam at the output end face of the at least one optical fiber, wherein the offset is relative to an ideal location on the output end face and the tilt is relative to an ideal central axis of the at least one optical fiber; and
    d) using the offset, the tilt, and the MFD in a Gaussian field model to predict the insertion loss that would result when connecting to a reference optical fiber of a reference optical fiber connector.

2. The method according to claim 1, wherein the MFD is obtained by measuring a beam width for each of the two or more output-beam images and extrapolating the beam width back towards the at least one optical fiber to determine a location and a size of a beam waist of the output light beam at the output end face.

3. The method according to claim 2, wherein the fitting of the Gaussian curve includes determining a distance d from the output end face of the at least one optical fiber to the sensor array for each of the two or more measurement positions by calculating a centroid position for each of the two or more output-beam images and extrapolating the centroid positions to the location of the beam waist.

4. The method according to claim 1, wherein the capturing of the at least one output-beam image for at least one of the two or more measurement positions comprises capturing multiple output-beam images and averaging the multiple output-beam images to define the output-beam image that is associated with that measurement position.

5. The method according to claim 4, further comprising converting each of the multiple output-beam images to double-precision images before said averaging.

6. The method according to claim 1, wherein the sensor array is moved between the measurement positions in increments in the range from 10 μm to 100 μm.

7. The method according to claim 1, wherein the at least one optical fiber comprises multiple optical fibers, and wherein the sending of the light comprises sending the light down two or more of the multiple optical fibers.

8. The method according to claim 1, wherein the sending of the light comprises sending the light down multiple and non-adjacent optical fibers of the test optical fiber connector.

9. The method according to claim 1, wherein the sending of the light comprises sending the light through a scanning slit member having at least one slit that is aligned with an input end of the at least one optical fiber.

10. The method according to claim 1, wherein the capturing of the at least one output-beam image and subsequent steps are performed for multiple optical wavelengths, producing different output-beam images corresponding to the same measurement positions, and wherein subsequent steps are performed using the different output-beam images.

11. A non-contact method of predicting an insertion loss of a test optical fiber connector when connecting to at least one reference optical fiber of a reference optical fiber connector, the test optical fiber connector supporting at least one optical fiber, the method comprising:
   a) sending light down the at least one optical fiber in a fundamental mode of the light and emitting an output light beam;
   b) for each of multiple measurement positions at different axial distances from the at least one optical fiber, capturing at least one output-beam image to define multiple output-beam images each associated with one of the multiple measurement positions;
   c) fitting a Gaussian curve to the multiple output-beam images to determine a mode field diameter (MFD), an offset, and a tilt of the output light beam; and
   d) employing a Gaussian field model that incorporates the offset, the tilt, and the MFD to predict the insertion loss.

12. The non-contact method according to claim 11, wherein the capturing of the at least one output-beam image for at least one of the multiple measurement positions comprises capturing multiple output-beam images and averaging the multiple output-beam images to define the output-beam image that is associated with that measurement position.

* * * * *